United States Patent
Lee et al.

(10) Patent No.: US 11,405,963 B2
(45) Date of Patent: Aug. 2, 2022

(54) ELECTRONIC DEVICE FOR ESTABLISHING COMMUNICATION WITH EXTERNAL ELECTRONIC DEVICE AND METHOD OF CONTROLLING THE SAME

(71) Applicant: Samsung Electronics Co., Ltd., Suwon-si (KR)

(72) Inventors: Jaehyeok Lee, Suwon-si (KR); Taikuin Mun, Suwon-si (KR); Wonjung Lee, Suwon-si (KR); Jaehoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/863,141

(22) Filed: Apr. 30, 2020

(65) Prior Publication Data

US 2020/0351958 A1 Nov. 5, 2020

(30) Foreign Application Priority Data

May 3, 2019 (KR) .................. 10-2019-0052304

(51) Int. Cl.
*H04W 76/10* (2018.01)
*H04W 76/30* (2018.01)
*H04M 1/72448* (2021.01)

(52) U.S. Cl.
CPC ....... *H04W 76/10* (2018.02); *H04M 1/72448* (2021.01); *H04W 76/30* (2018.02)

(58) Field of Classification Search
CPC .. H04W 76/10; H04W 76/30; H04M 1/72448
(Continued)

(56) References Cited

U.S. PATENT DOCUMENTS

2003/0025603 A1\* 2/2003 Smith .................. H04W 12/08
340/572.8
2009/0081999 A1 3/2009 Khasawneh et al.
(Continued)

FOREIGN PATENT DOCUMENTS

KR 10-2014-0104858 A 8/2014
KR 10-2015-0135057 A 12/2015
WO 2018/236290 A1 12/2018

OTHER PUBLICATIONS

European Search Report dated Aug. 6, 2020, issued in European Application No. 20172498.6-1213.
(Continued)

*Primary Examiner* — William Nealon
(74) *Attorney, Agent, or Firm* — Jefferson IP Law, LLP

(57) ABSTRACT

An electronic device provided. The electronic device comprises at least one communication circuit configured to perform communication with at least one external device, at least one processor operatively connected with the at least one communication circuit, and a memory operatively connected with the at least one processor, wherein the memory stores instructions to, when executed, enable the at least one processor to control the at least one communication circuit to establish a first communication connection with a first wearable device, control the at least one communication circuit to receive a signal for establishing a second communication connection from a second wearable device, the signal including information indicating whether a user wears the second wearable device, identify whether the user wears the second wearable device based on the information, and based on identifying that the user wears the second wearable device, control the at least one communication circuit to release the first communication connection and establish the
(Continued)

second communication connection with the second wearable device. Other various embodiments are possible as well.

20 Claims, 17 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2014/0235167 A1 | 8/2014 | Jung et al. | |
| 2014/0334271 A1* | 11/2014 | Park | G04G 21/08 |
| | | | 368/10 |
| 2015/0289308 A1* | 10/2015 | Kang | H04W 12/068 |
| | | | 455/41.2 |
| 2015/0341901 A1 | 11/2015 | Ryu et al. | |
| 2015/0341902 A1* | 11/2015 | Ryu | H04M 1/725 |
| | | | 455/458 |
| 2016/0104006 A1* | 4/2016 | Son | G06F 21/34 |
| | | | 726/20 |
| 2016/0105924 A1* | 4/2016 | Baek | H04W 84/18 |
| | | | 455/41.2 |
| 2017/0007183 A1* | 1/2017 | Dusan | A61B 5/02416 |
| 2018/0206281 A1 | 7/2018 | Zhang | |

OTHER PUBLICATIONS

International Search Report and Written Opinion dated Jul. 29, 2020, issued in International Application No. PCT/KR2020/005724.

* cited by examiner

ELECTRONIC DEVICE FOR ESTABLISHING COMMUNICATION WITH EXTERNAL ELECTRONIC DEVICE AND METHOD OF CONTROLLING THE SAME

CROSS-REFERENCE TO RELATED APPLICATION(S)

This application is based on and claims priority under 35 U.S.C. § 119(a) of a Korean patent application number 10-2019-0052304, filed on May 3, 2019, in the Korean Intellectual Property Office, the disclosure of which is incorporated by reference herein in its entirety.

BACKGROUND

1. Field

The disclosure relates to an electronic device for establishing communication with an external electronic device and a method for controlling the same.

2. Description of Related Art

Portable digital communication devices have become a must-have item for everyone in the modern era. Customers desire to receive various high-quality services anytime, anywhere using their portable digital communication devices.

Portable digital communication devices, along with various external electronic devices, deliver high-quality services. Portable digital communication devices establish communication with different external electronic devices per service desired by the user and they, along with different external electronic devices, provide the user's desired service.

Technology for switching communication connections between a portable digital communication device and various external electronic devices is required to seamlessly provide the user with different services based on cooperation between the portable digital communication device and the external electronic devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that establishes communication with an external electronic device that has a function corresponding to the user's desired service and provide the user's desired service based on the function of the external electronic device. For example, while the electronic device performs communication connection with a wearable device to provide the user with a service, the user may want the electronic device to establish communication with another wearable device to receive another service. However, since the electronic device is performing communication connection with the one wearable device, the electronic device performs at least one operation according to the user's series of control for communication connection with the other wearable device.

Further, the electronic device is unaware whether the other wearable device is the one the user desires to establish communication with and, thus, the electronic device performs at least one operation according to the user's series of control to allow the electronic device to recognize the same.

Another aspect of the disclosure is to provide an electronic device and method of controlling the same, the electronic device, while performing communication connection with one external electronic device (e.g., a wearable device), may identify whether another external electronic device (e.g., another wearable device) is the target the user desires to connect communication with (e.g., identifies whether the user wears it) and automatically perform communication connection with the other external electronic device. This eliminates the need for the electronic device to perform at least one operation according to the user's series of control for communication connection with the other wearable device, relieving the electronic device of operation loads that would be caused otherwise. Also, the electronic device does not need to perform at least one operation according to the user's series of control to recognize the external electronic device with which the user desires to establish communication, thus being relieved of operation loads that would be caused otherwise.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication circuit configured to perform communication with at least one external device, at least one processor operatively connected with the at least one communication circuit, and a memory operatively connected with the at least one processor, wherein the memory stores instructions to, when executed by the at least one processor, enable the at least one processor to control the at least one communication circuit to establish a first communication connection with a first wearable device, control the at least one communication circuit to receive a signal for establishing a second communication connection from a second wearable device, the signal including information indicating whether a user wears the second wearable device, identify whether the user wears the second wearable device based on the information, and based on identifying that the user wears the second wearable device, control the at least one communication circuit to release the first communication connection and establish the second communication connection with the second wearable device.

In accordance with another aspect of the disclosure, a wearable device is provided. The wearable device includes at least one communication circuit for performing communication with at least one external electronic device, at least one processor operatively connected with the at least one communication circuit, and a memory operatively connected with the at least one processor, wherein the memory stores instructions to, when executed by the at least one processor, enable the at least one processor to identify whether a user wears the wearable device, control the at least one communication circuit to broadcast a signal for establishing a communication connection based on identifying that the user wears the wearable device, the signal including identification information about the wearable device and information indicating whether the user wears the wearable device, and control the at least one communication circuit to receive, from at least one external electronic device, a request message for establishing a communication based on the broadcasted signal.

In accordance with another aspect of the disclosure, a method of controlling an electronic device is provided. The method includes establishing a first communication connection with a first wearable device using at least one communication circuit of the electronic device, receiving a signal for establishing a second communication connection from a second wearable device using the at least one communication circuit, the signal including information indicating whether a user wears the second wearable device, identifying whether the user wears the second wearable device based on the information, and based on identifying that the user wears the second wearable device, releasing the first communication connection and establishing the second communication connection with the second wearable device using the at least one communication circuit.

Embodiments of the disclosure are not limited to the foregoing objectives, and other objectives would readily be appreciated by a skilled artisan from the following detailed description taken in conjunction with the accompanying drawings.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
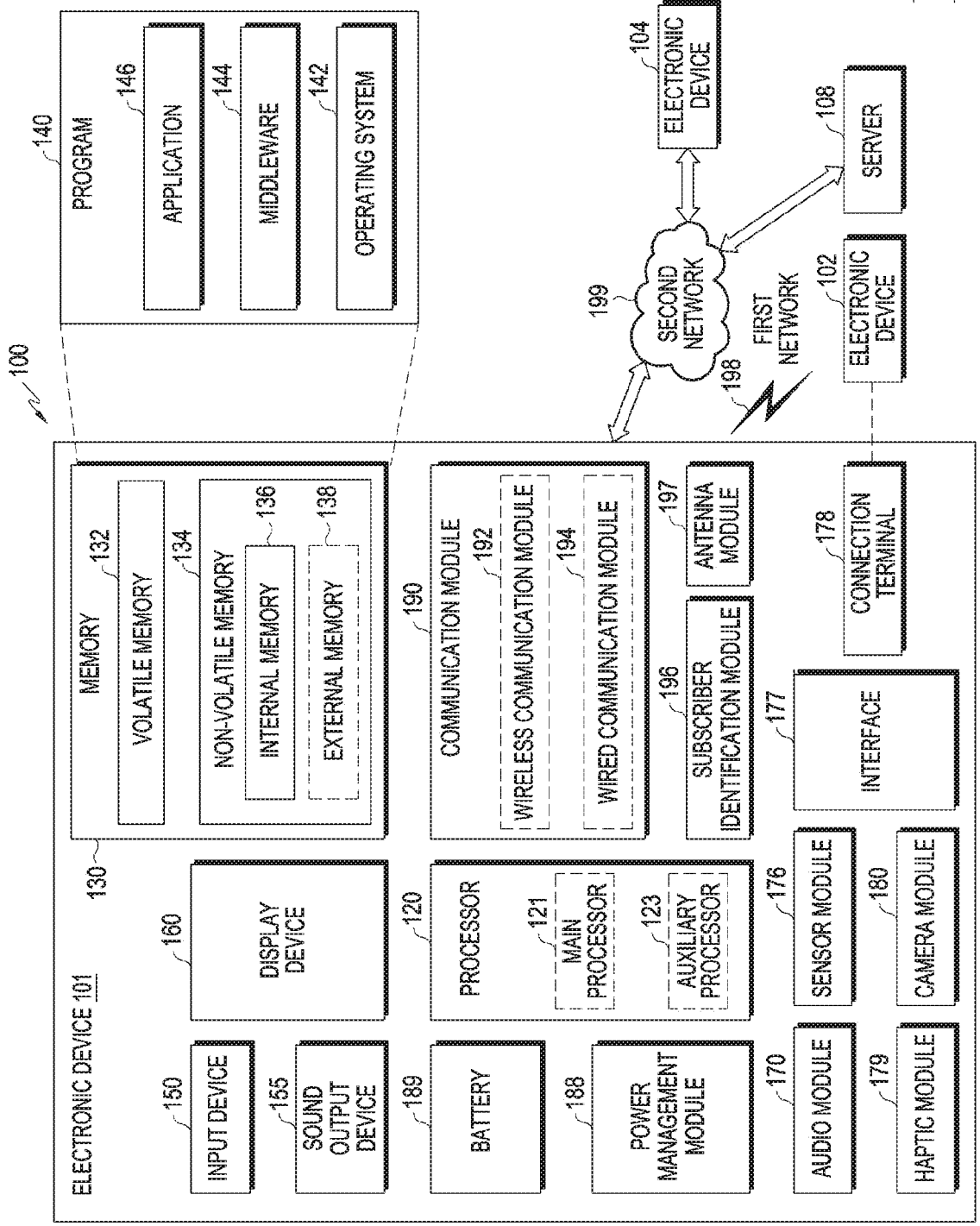
FIG. 1 is a view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The at least one processor 120 may execute, for example, software (e.g., a program 140) to control at least one other component (e.g., a hardware or software component) of the electronic device 101 coupled with the at least one processor 120, and may perform various data processing or computation. According to one embodiment, as at least part of the data processing or computation, the at least one processor 120 may load a command or data received from another component (e.g., the sensor module 176 or the communication module 190) in volatile memory 132, process the command or the data stored in the volatile memory 132, and store resulting data in non-volatile memory 134. According to an embodiment, the at least one processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the at least one processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the at least one processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the at least one processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the at least one processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, example electronic devices and example methods of controlling the electronic devices are described according to various embodiments.

Although it is described below that the at least one processor 120 controls at least one component of the electronic device 101 to perform the operations of the electronic device 101, embodiments of the disclosure are not limited thereto. For example, instructions or computer code triggering the operations of the electronic device 101 described below may be stored in the memory 130. The stored instructions or computer code may trigger the at least one processor 120 to process the operations using at least one component of the electronic device 101.

Hereinafter, example embodiments of electronic device 101 and example methods of controlling the electronic device 101 are described according to various embodiments. No duplicate description is made below in connection with the operations of the electronic device 101.

According to an embodiment, when the user with a first wearable device on puts on a second wearable device, the electronic device may release the existing communication connection with the first wearable device and establish communication with the second wearable device. In other words, if the user newly wears another wearable device, the electronic device 101 may switch communication connection from the already worn (or communication-connected) wearable device to the newly worn wearable device. This operation of the electronic device 101 may be defined as auto-switching. The function of a wearable device to trigger auto-switching or support auto-switching may be defined as an auto-switching function.

Figure 2:
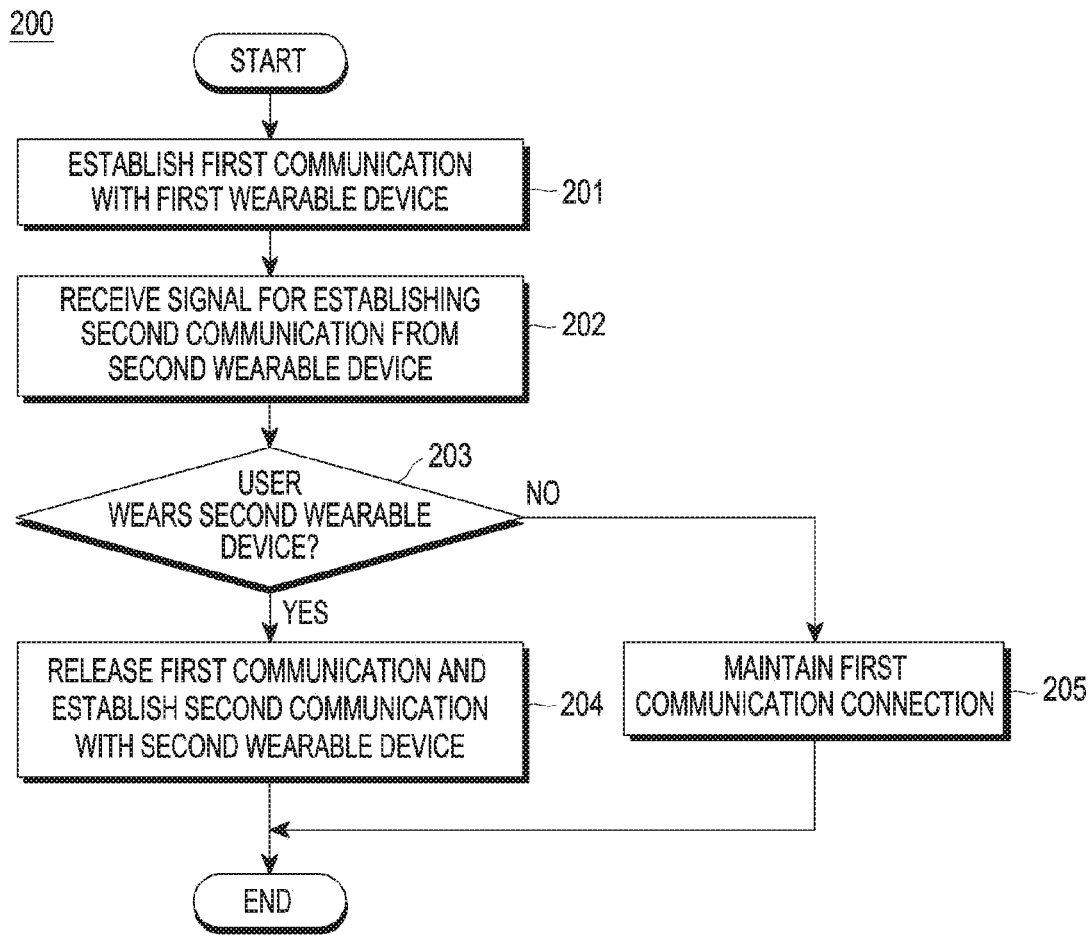
FIG. 2 is a flowchart illustrating an example of auto-switching by an electronic device according to an embodiment of the disclosure.

FIG. 2 is a flowchart 200 illustrating an example of auto-switching by an electronic device according to an embodiment of the disclosure.

Referring to FIG. 2, operations of the electronic device 101 are not limited in order to the operations of the electronic device 101 shown in FIG. 2 and may be performed in a different order than that shown. According to an embodiment, other additional operations than the operations of the electronic device 101 shown in FIG. 2 may be performed or some of the operations of the electronic device 101 shown in FIG. 2 may be omitted. FIG. 2 is described below with reference to FIG. 3.

Figure 3:
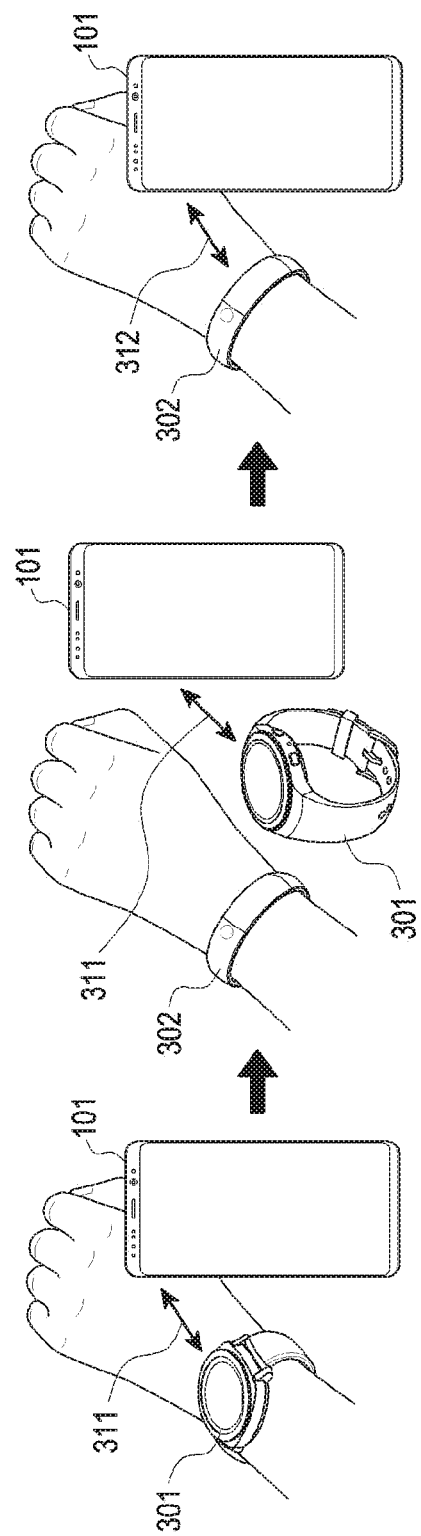
FIG. 3 is a view illustrating an example of auto-switching by an electronic device according to an embodiment of the disclosure.

FIG. 3 is a view illustrating an example of auto-switching by an electronic device according to an embodiment of the disclosure.

Referring to FIG. 3, an electronic device 101 (e.g., at least one processor 120) may control at least one communication circuit (e.g., the communication module 190 or a communication circuit included in the communication module 190) to establish first communication 311 with a first wearable device 301 as shown in FIG. 3, in operation 201. The electronic device 101 may receive a signal (e.g., a communication request signal or advertising signal) for establishing communication from the first wearable device 301 and discover the first wearable device 301. Based on the occurrence of an event (e.g., reception of the user's input to establish communication with the discovered first wearable device 301) for establishing first communication 311 with the discovered first wearable device 301, the electronic device 101 may establish the first communication 311 with the first wearable device 301.

According to an embodiment, an electronic device 101 (e.g., at least one processor 120) may control at least one communication circuit (e.g., the communication module 190 or a communication circuit included in the communication module 190) to establish first communication 311 with a first wearable device 301, based on other various communication schemes. The communication schemes may include relay (e.g., Wi-Fi)-based communication schemes, Wi-Fi-direct, Bluetooth, Bluetooth low energy (BLE), other device-to-device (D2D)-based communication schemes. For example, the first communication 311 may be a BLE communication scheme. When the first communication 311 is a BLE communication scheme, if the first wearable device 301 is positioned within a designated distance from the electronic device 101, e.g., as the user wears the first wearable device 301, the electronic device 101 may receive a signal (e.g., an advertising signal) for establishing communication broadcast from the first wearable device 301. If the first communication 311 is a communication scheme other than the BLE communication scheme, the electronic device 101 may receive a signal for establishing communication, such as an advertising signal, in the corresponding communication scheme, from the first wearable device 301.

According to an embodiment, the electronic device 101 (e.g., at least one processor 120) may control the at least one communication circuit (e.g., the communication module 190 or a communication circuit included in the communication module 190) to receive information related to the first wearable device 301 from the first wearable device 301 via the first communication 311. For example, the electronic device may receive the user's biometric information identified based on at least one sensor (e.g., a heartrate sensor or proximity sensor) of the first wearable device 301 from the first wearable device 301.

According to an embodiment, the wearable device may be one of various kinds of electronic devices, such as smartwatches, smart bands, smart glasses, head-mounted displays (HIMDs), or other electronic devices wearable on the user's body part (e.g., the wrist, head, or ankle). For example, the first wearable device 301 may be a smart watch as shown in FIG. 3.

According to an embodiment, the electronic device 101 (e.g., at least one processor 120), in operation 202, may control the at least one communication circuit (e.g., the communication module 190 or a communication circuit included in the communication module 190) to receive a signal for establishing second communication 312 from a second wearable device 302. For example, if the second communication 312 is a D2D communication scheme-based communication (e.g., BLE communication scheme-based communication), when the second wearable device 302 is positioned within a distance defined by the communication scheme from the electronic device 101, the electronic device 101 may receive a signal for establishing the second communication 312 from the second wearable device 302 while the first communication 311 is maintained between the electronic device 101 and the first wearable device 301.

According to an embodiment, the electronic device 101 (e.g., at least one processor 120) may control the at least one communication circuit (e.g., the communication module 190 or a communication circuit included in the communication module 190) to receive a signal for establishing communication, based on various communication schemes, from the second wearable device 302. No duplicate description of the communication schemes is presented. For example, the second communication 312 may be BLE communication scheme-based communication. When the second communication 312 is a BLE communication scheme, if the second wearable device 302 is positioned within a designated distance from the electronic device 101, e.g., as the user wears the second wearable device 302 as shown in FIG. 3, the electronic device 101 may receive a signal (e.g., an advertising signal) for establishing communication broadcast from the second wearable device 302. If the second communication 312 is a communication scheme other than the BLE communication scheme, the electronic device 101 may receive a signal for establishing communication, such as an advertising signal, in the corresponding communication scheme, from the second wearable device 302.

According to an embodiment, the electronic device 101 (e.g., at least one processor 120) may identify whether the user wears the second wearable device 302 in operation 203. For example, if the electronic device 101 receives a signal for establishing communication from the second wearable device 302 while connecting the first communication 311 with the first wearable device 301, the electronic device 101 may identify whether the second wearable device 302 is worn based on wearing information included in the signal received from the second wearable device 302. According to an embodiment, the signal for establishing communication may include information indicating whether the wearable device is worn on the user. The wearing information may be information indicating whether the user wears the second wearable device 302. The second signal including the wearing information and the electronic device's operation of identifying whether the second wearable device 302 is worn are described below in detail.

According to an embodiment, the electronic device 101 (e.g., at least one processor 120) may release the connection of the first communication 311 and establish the second communication 312 with the second wearable device 302 based on identifying that the user wears the second wearable device 302 in operation 204, or the electronic device 101 (e.g., at least one processor 120) may control the at least one communication circuit (e.g., the communication module 190 or a communication circuit included in the communication module 190) to maintain the connection of the first communication 311 with the first wearable device 301 based on identifying that the user does not wear the second wearable device 302 in operation 205.

In other words, the electronic device 101 (e.g., at least one processor 120) may control the at least one communication circuit (e.g., the communication module 190 or a communication circuit included in the communication module 190) to switch the communication connection to the newly worn wearable device (e.g., the second wearable device) as shown in FIG. 3. Based on identifying that the second wearable device 302 is worn, the electronic device 101 may transmit a message for requesting to release the communication connection to the first wearable device 301 and transmit a message for communication connection to the second wearable device 302. Based on transmission of a message for communication connection from the second wearable device 302, the electronic device 101 may establish the second communication 312 with the second wearable device 302 or the electronic device 101 may receive a communication connection response message corresponding to the transmission of the message for communication connection from the second wearable device 302, and the electronic device 101 may establish the second communication 312 with the second wearable device 302 based on the received communication connection response message.

The electronic device 101 (e.g., at least one processor 120) may control at least one communication circuit (e.g., the communication module 190 or a communication circuit included in the communication module 190) to receive information related to the second wearable device 302 from the second wearable device 302 via the second communication 312 or to transmit data related to a specific service to the second wearable device 302 so that the second wearable device 302 may provide the specific service (e.g., a voice service). In other words, the electronic device 101, together with the second wearable device 302, may provide various services to the user by transmitting/receiving various pieces of information with the communication-connected second wearable device 302.

As an example, although the first communication 311 and the second communication 312 have been described as BLE communication scheme-based communication, embodiments of the disclosure are not limited thereto, but the first communication 311 and the second communication 312 may be identical or different from each other. For example, the first communication 311 may be Bluetooth communication scheme-based communication, and the second communication 312 may be BLE communication scheme-based communication. The first communication 311 may be BLE communication scheme-based communication, and the second communication 312 may be communication based on a communication scheme using a predetermined relay, such as of Wi-Fi, or other kind of D2D communication (e.g., WiFi-Direct, near-field communication (NFC), or ultra-wideband (UWB) communication).

If another wearable device is worn by the user while the electronic device 101 is already in communication connection with a wearable device, the electronic device 101 may automatically perform communication connection with the newly worn wearable device, thereby eliminating the need for a series of operations for establishing a communication connection to the newly worn wearable device and relieving the electronic device 101 of operation loads.

Hereinafter, another example embodiment of electronic device 101 and a method for controlling the same are described according to an embodiment. No duplicate description is made below in connection with the operations of the electronic device 101.

According to an embodiment, the electronic device 101 may perform at least one operation (e.g., scanning or at least one or more identification operations) based on at least one signal received from wearable devices to establish communication with a newly worn wearable device (e.g., the second wearable device 302).

Figure 4:
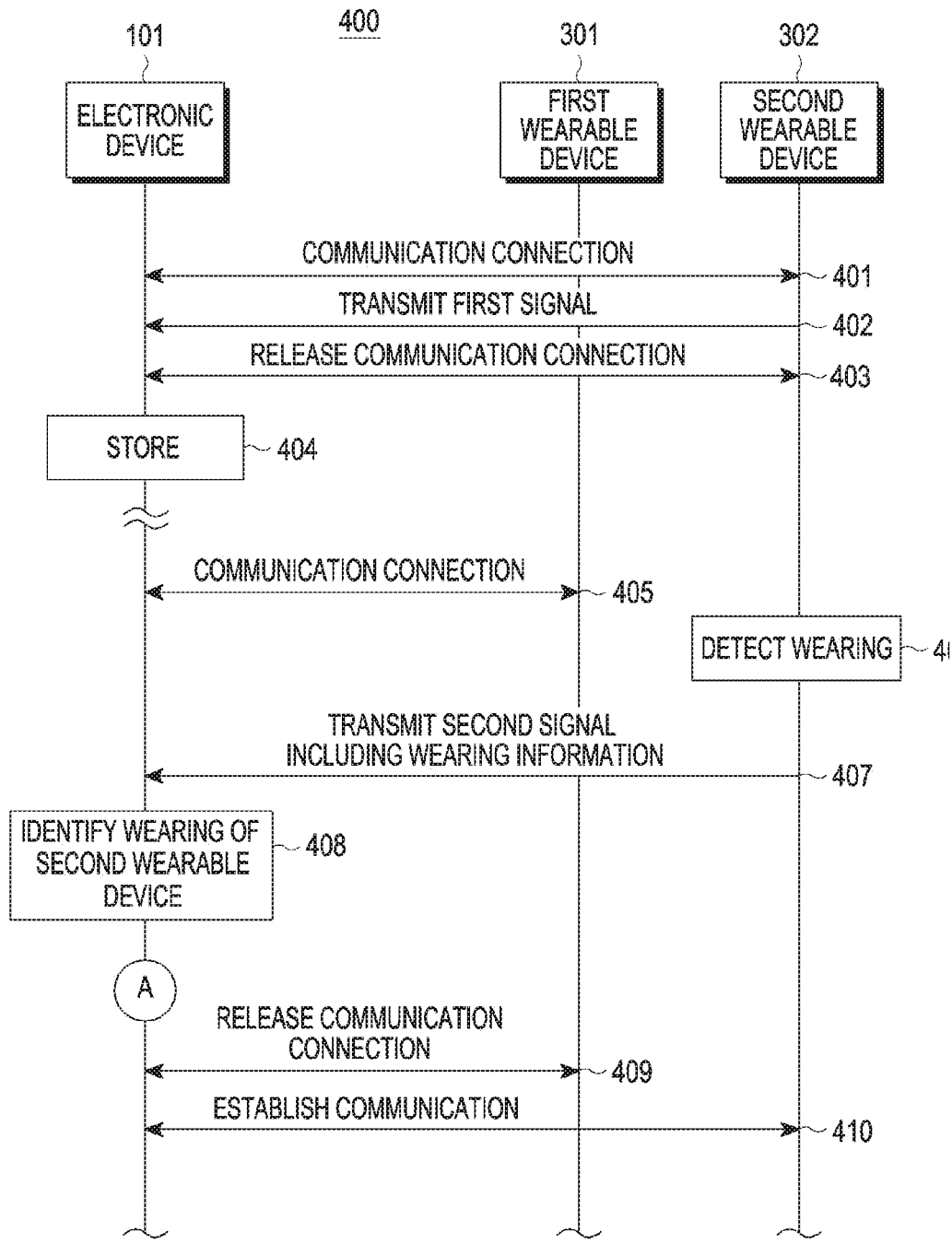
FIG. 4 is a flowchart illustrating example operations of an electronic device and wearable devices according to an embodiment of the disclosure.

FIG. 4 is a flowchart 400 illustrating example operations of an electronic device 101 and wearable devices according to an embodiment of the disclosure.

Referring to FIG. 4, operations of the electronic device 101 are not limited in order to the operations of the electronic device 101 shown in FIG. 4 and may be performed in a different order than that shown. According to an embodiment, other additional operations than the operations of the electronic device 101 shown in FIG. 4 may be performed or some of the operations of the electronic device 101 shown in FIG. 4 may be omitted. FIG. 4 is described below with reference to FIGS. 5 and 6.

Figure 5:
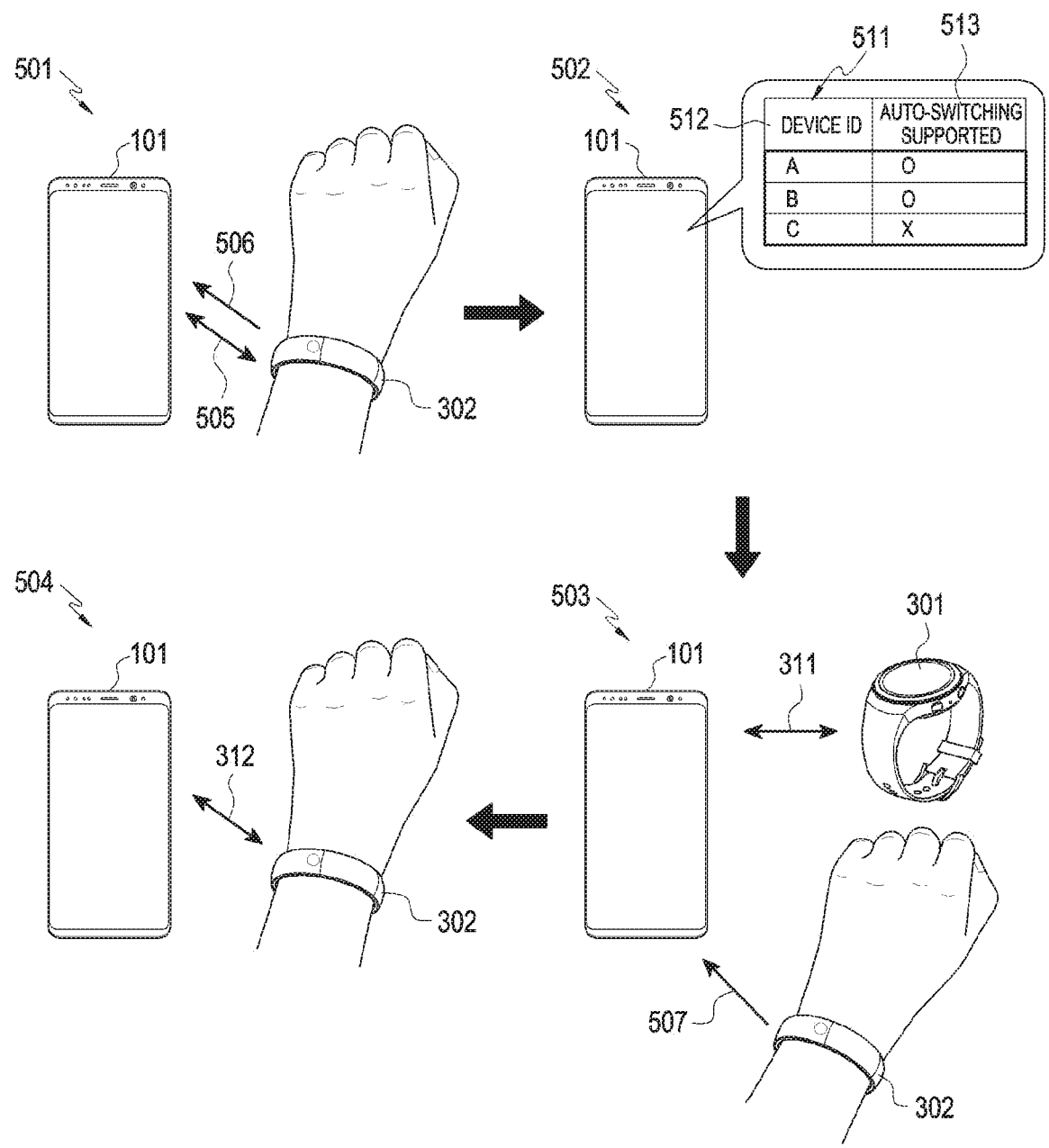
FIG. 5 is a view illustrating example operations of an electronic device and wearable devices according to an embodiment of the disclosure.

FIG. 5 is a view illustrating example operations of an electronic device 101 and wearable devices according to an embodiment of the disclosure.

Figure 6:
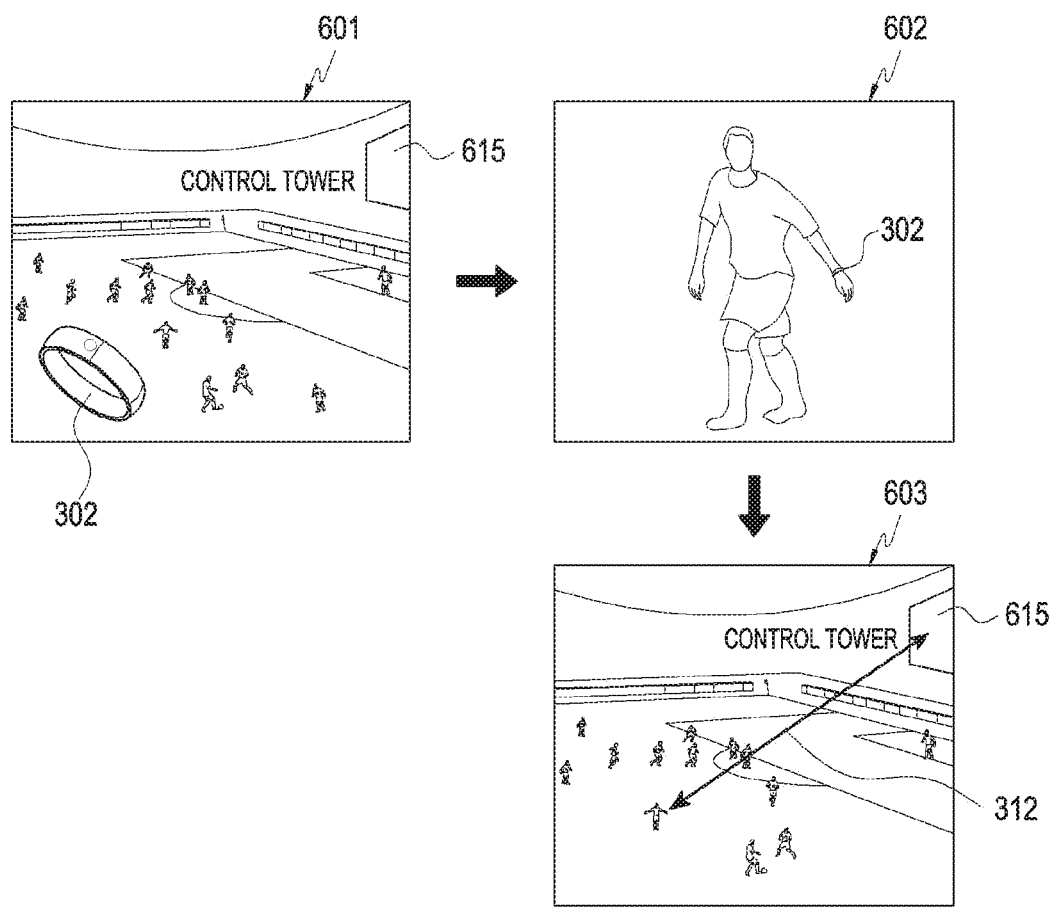
FIG. 6 is a view illustrating other example operations of an electronic device and wearable devices according to an embodiment of the disclosure.

FIG. 6 is a view illustrating other example operations of an electronic device 101 and wearable devices according to an embodiment of the disclosure.

Referring to FIGS. 4 and 5, at operation 401, an electronic device 101 (e.g., at least one processor 120) may control at least one communication circuit (e.g., the communication module 190 or a communication circuit included in the communication module 190) to establish communication connection 505 with a second wearable device 302 as in 501 of FIG. 5. The communication connection 505 between the electronic device 101 and the second wearable device 302 may be performed like establishing the first communication 311 between the electronic device 101 and the first wearable device 301 as in operation 201 described above.

According to an embodiment, at operation 402, an electronic device 101 (e.g., at least one processor 120) may control at least one communication circuit (e.g., the communication module 190 or a communication circuit included in the communication module 190) to receive a first signal 506 from the second wearable device 302 as in 501 of FIG. 5. In other words, the second wearable device 302 may transmit the first signal 506 to the electronic device 101 via the communication connection 505 with the electronic device 101.

According to an embodiment, the first signal 506 may include various pieces of information. For example, the first signal 506 may include identification information (e.g., device ID, MAC address or other communication address) about the second wearable device 302. For example, the first signal 506 may include information indicating whether the second wearable device 302 supports a function for performing auto-switching. In other words, the first signal 506 may include information indicating whether the wearable device supports a function of triggering the auto-switching function of the electronic device 101.

According to an embodiment, the electronic device 101 (e.g., at least one processor 120) may identify the second wearable device 302 based on the identification information included in the first signal 506 received from the second wearable device 302 and may identify that the second wearable device 302 is a device supporting the function based on the information indicating whether to support the function for performing auto-switching included in the first signal 506.

According to an embodiment, at operation 403, the electronic device 101 (e.g., at least one processor 120) may control at least one communication circuit (e.g., the communication module 190 or a communication circuit included in the communication module 190) to release the communication connection with the second wearable device 302. For example, the electronic device 101 may release the communication connection with the second wearable device 302 based on identifying the occurrence of an event for releasing the communication connection with the second wearable device 302 (e.g., reception of an input for releasing the communication connection with the second wearable device 302 from the user). Thereafter, the second wearable device 302 may turn into the state in which it cannot perform communication with the electronic device 101 (e.g., when it powers off or when it is in the position where it cannot communicate with the electronic device 101).

According to an embodiment, the electronic device 101 (e.g., at least one processor 120) may store information 511 related to at least one wearable device (e.g., the second wearable device 302) previously communication-connected in the memory 130, as in 502 of FIG. 5, in operation 404. For example, the information may include identification information (e.g., device ID (device A, device B, or device C)) 512 about at least one wearable device (e.g., the second wearable device 302) previously communication-connected and information 513 about whether to support the auto-switching function corresponding to the identification information (or of the wearable device). For example, the information 513 about whether to support the auto-switching function may be information indicating whether the wearable device (e.g., the second wearable device 302) has a function of triggering the auto-switching of the electronic device 101. The electronic device 101 may perform scanning based on the stored information which is described below in connection with FIGS. 7 and 8.

According to an embodiment, the electronic device 101 (e.g., at least one processor 120) may control at least one communication circuit (e.g., the communication module 190 or a communication circuit included in the communication module 190) to connect communication with a first wearable device 301 in operation 405 as in 503 of FIG. 5. The communication connection between the electronic device 101 and the first wearable device 301 may be performed like establishing the first communication 311 between the electronic device 101 and the first wearable device 301 as in operation 201 described above.

According to an embodiment, if the user wears the second wearable device 302 as in 601 and 602 of FIG. 6 or 503 of FIG. 5, the second wearable device 302 may detect that the user wears the second wearable device 302 in operation 406. For example, the second wearable device 302 may identify whether the user wears the second wearable device 302 based on various pieces of information. For example, the pieces of information may include at least one of information obtained as the user controls the second wearable device 302 (e.g., pressing a physical key (e.g., a button) or touching the touchscreen), the user's biometric information identified based on at least one or more sensors (e.g., a heartrate sensor or proximity sensor), radio frequency (RF) information, or sending data (e.g., hall sensing data) by which a mechanical coupling is identifiable. The pieces of information for identifying whether the user wears the second wearable device 302 are not limited thereto but may include other various pieces of information by which it may be identified whether the user wears the second wearable device 302 by analysis.

According to an embodiment, the electronic device 101 (e.g., at least one processor 120) may receive a second signal 507 including wearing information from the second wearable device 302, as in 503 of FIG. 5, in operation 407.

In other words, the second wearable device 302 may transmit the second signal 507 including the wearing information to the electronic device 101 in operation 407. In this case, the second signal may be a signal based on a D2D communication scheme to perform communication within a short range as shown in FIG. 6, a signal based on a wireless communication scheme to use a predetermined relay as shown in FIG. 6, or a signal based on a D2D communication scheme capable of communication even when the electronic device 101 is located far away from the wearable device. Although not shown, even before detecting the wearing in operation 406, the second wearable device 302 may transmit a signal for establishing communication in which case the signal may include information indicating the wearable device is not worn. This is described below in greater detail.

According to an embodiment, the electronic device 101 (e.g., at least one processor 120) may identify whether the second wearable device 302 is worn in operation 408. For example, upon receiving a second signal 507 for establishing communication from at least one wearable device (e.g., the second wearable device 302) while the electronic device 101 is in communication connection with the first wearable device 301, the electronic device 101 may identify the second wearable device 302, identify whether the user wears the second wearable device 302 based on the wearing information included in the second signal 507 and, if it is identified whether the second wearable device 302 is worn, the electronic device 101 may perform operations 409 and 410. Upon receiving a signal for communication connection from another wearable device (not shown) while being in communication connection with the first wearable device 301, the electronic device 101 may refrain from performing operations 409 and 410 if it is identified that the received signal for communication connection does not include the wearing information. In other words, upon receiving a signal for establishing communication, which does not include the wearing information, from another wearable device while in communication connection with one wearable device (e.g., the first wearable device 301), the electronic device 101 may refrain from performing auto-switching. Based on the signal not including the wearing information, the electronic device 101 may provide information indicating that communication connection to another wearable device is possible (e.g., display information about the other wearable device if the user invokes an interface displaying available wearable devices). According to an embodiment, the electronic device 101 (e.g., at least one processor 120) may release the connection of the first communication 311 in operation 409 and control at least one communication circuit (e.g., the communication module 190 or a communication circuit included in the communication module 190) to establish the second communication 312 with the second wearable device 302 in operation 410. For example, the electronic device 101 may release the already connected first communication 311 and establish the second communication 312 with the second wearable device 302 based on identifying that the user wears the second wearable device 302 in operation 408.

In other words, if identifying that the user wears the second wearable device 302 based on the second signal 507 received from the second wearable device 302, the electronic device 101 (e.g., at least one processor 120) may switch the communication connection to the second wearable device 302 and, if identifying that the user does not wear the second wearable device 302 based on the second signal 507 received from the second wearable device 302, the electronic device 101 may control the at least one communication circuit (e.g., the communication module 190 or a communication circuit included in the communication module 190) to maintain the first communication 311 with the first wearable device 301 already in connection.

According to an embodiment, the electronic device 101 (e.g., at least one processor 120) may control at least one communication circuit (e.g., the communication module 190 or a communication circuit included in the communication module 190) to receive a signal including information related to the second wearable device 302 from the second wearable device 302 via the connected second communication 312 as in 504 of FIG. 5. The operation of receiving, by the electronic device 101, the information related to the second wearable device 302 from the second wearable device 302 via the second communication 312 may be performed like the operation of receiving the information related to the first wearable device 301 from the first wearable device 301 via the first communication 311. Thus, no repetitive description is given.

Referring to FIG. 6, the electronic device 101 (e.g., an electronic device 101 in a control tower 615) may control at least one communication circuit (e.g., the communication module 190 or a communication circuit included in the communication module 190) to receive a signal including information related to the second wearable device 302 from the second wearable device 302 via the connected second communication 312 as in 603 of FIG. 6. The electronic device 101 may provide various services (e.g., obtaining the results of analysis of the user's biometric information) based on the information received from the second communication 312. At least one of the first communication 311 or second communication 312 may be a wireless communication scheme using a predetermined relay or may be a D2D communication scheme capable of communication even though the electronic device 101 is far away from the wearable device.

Hereinafter, another example embodiment of electronic device 101 and a method for controlling the same are described according to an embodiment. No duplicate description is made below in connection with the operations of the electronic device 101.

According to an embodiment, the electronic device 101 may perform different scanning operations before and after communication connection with an external device (e.g., a wearable device).

Figure 7:
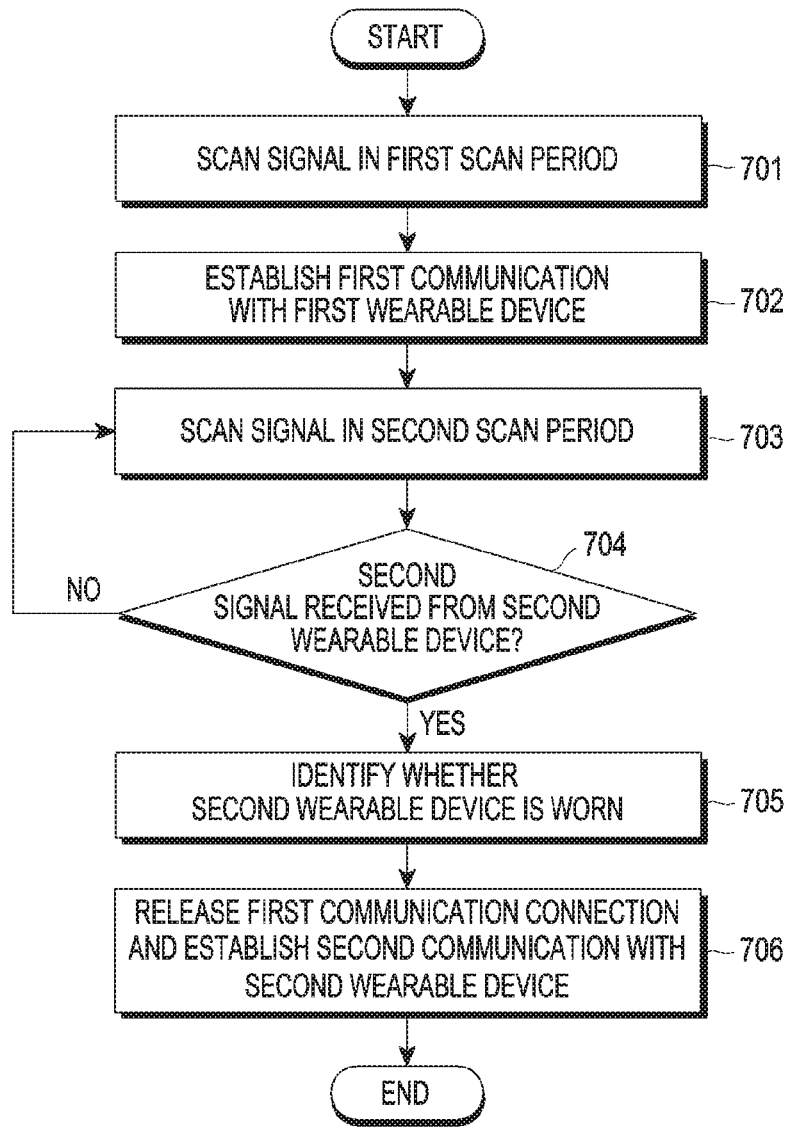
FIG. 7 is a flowchart illustrating scanning by an electronic device according to an embodiment of the disclosure.

FIG. 7 is a flowchart 700 illustrating scanning by an electronic device 101 according to an embodiment of the disclosure.

Referring to FIG. 7, operations of the electronic device 101 are not limited in order to the operations of the electronic device 101 shown in FIG. 7 and may be performed in a different order than that shown. According to an embodiment, other additional operations than the operations of the electronic device 101 shown in FIG. 7 may be performed or some of the operations of the electronic device 101 shown in FIG. 7 may be omitted. FIG. 7 is described below with reference to FIG. 8.

Figure 8:
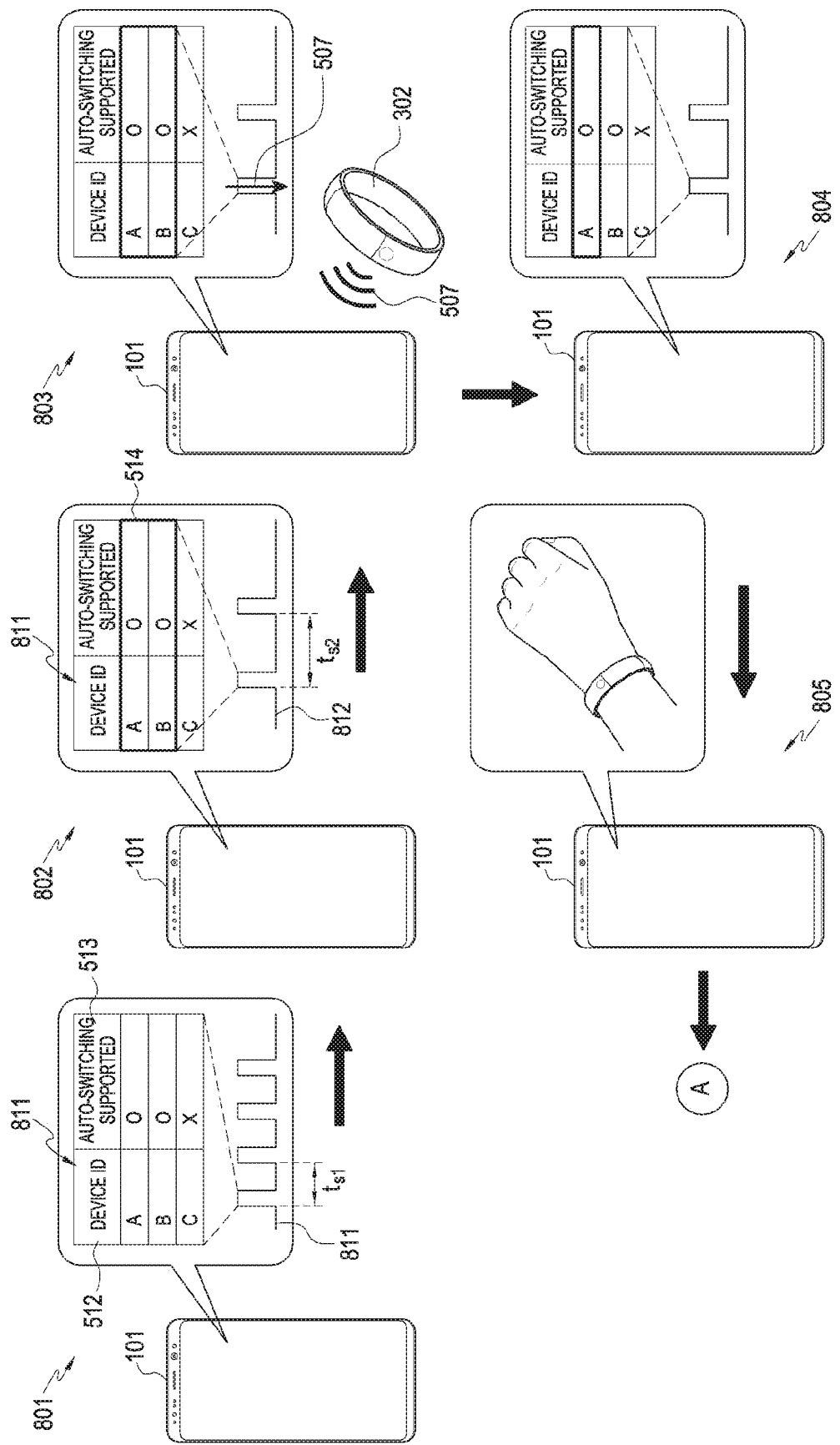
FIG. 8 is a view illustrating scanning by an electronic device according to an embodiment of the disclosure.

FIG. 8 is a view illustrating scanning by an electronic device 101 according to an embodiment of the disclosure.

Referring to FIG. 8, the horizontal axis and vertical axis of the scanning operation may denote the time and whether scanned, respectively.

According to an embodiment, the electronic device 101 (e.g., at least one processor 120) may scan signals in a first scan period $t_{s1}$ in operation 701. Before establishing communication with other external device (e.g., a wearable device) as in 801 of FIG. 8, the electronic device 101 (e.g., at least one processor 120) may scan (811) at least one wearable device previously communication-connected in a designated first scan period $t_{s1}$ based on information related to the at least one previously communication-connected wearable device. By receiving a signal for establishing communication from a certain wearable device while scanning (811), the electronic device 101 may discover the wearable device. The electronic device 101 may control the display to display information about the discovered wearable device based on identifying the occurrence of an event of requesting to provide the information about the discovered wearable device (e.g., reception of an input of requesting to display an interface to display the information about the discovered wearable device).

According to an embodiment, the electronic device 101 (e.g., at least one processor 120) may connect first communication 311 with the first wearable device 301 in operation 702. Operation 702 of the electronic device 101 may be performed like operation 405 described above, and no detailed description thereof is given below.

According to an embodiment, the electronic device 101 (e.g., at least one processor 120) may scan signals in a second scan period $t_{s2}$ in operation 703. For example, the electronic device 101 may scan (filtering scanning operation 812) signals in the second scan period $t_{s2}$, as shown in 802 of FIG. 8, to discover at least one wearable device supporting the auto-switching function while in communication connection with the first wearable device 301. The filtering scanning operation 812 of scanning at least one wearable device supporting the auto-switching function, by the electronic device 101, may be defined as filtering scanning.

For example, the electronic device 101 (e.g., at least one processor 120) may perform filtering scanning operation (812) if communication with another external device (e.g., the first wearable device 301) is established as shown in 802 of FIG. 8. For example, the electronic device 101 may scan only at least one wearable device 514 supporting the function of triggering the auto-switching of the electronic device 101 in the designated second scan period $t_{s2}$ based on at least part 512 of the information related to at least one wearable device previously communication-connected. The at least part 512 of the information related to the at least one wearable device previously communication-connected may be information regarding at least one first wearable device 301 (e.g., device A and device B) 514 supporting the auto-switching function as shown in 802 of FIG. 8. In other words, the electronic device 101 may perform filtering scanning to discover at least one first wearable device 301 (e.g., device A and device B) 514 supporting the auto-switching function.

According to an embodiment, the scan period (e.g., the first scan period $t_{s1}$) of scanning performed before communication connection with another external device may differ from the scan period (e.g., the second scan period ($t_{s2}$)) of scanning performed when communication-connected with the other external device (e.g., the first wearable device 301). For example, referring to 801 and 802 of FIG. 8, the second scan period $t_{s2}$ may be longer than the first scan period $t_{s1}$. In other words, the scan duty (first scan duty) of scanning performed before communication connection with the other external device may differ from the scan duty (second scan duty) of scanning performed when communication-connected with the other external device (e.g., the first wearable device 301). For example, referring to 501 and 502 of FIG. 5, the second scan duty may be lower than the first scan duty. Thus, setting a relatively lower scan duty for the electronic device 101 in the communication-connected state may relieve the electronic device 101 of operation loads due to scanning.

According to an embodiment, the electronic device 101 (e.g., at least one processor 120) may identify whether a signal for establishing communication is received from the second wearable device 302 in operation 704 and the electronic device 101 may identify whether the second wearable device is worn in operation 705. Operations 704 and 705 of the electronic device 101 may be performed like operations 407 and 408 described above, and no detailed description thereof is given below.

Upon receiving a signal for establishing communication from at least one wearable device while in communication connection with the first wearable device 301, the electronic device 101 (e.g., at least one processor 120) may identify at least one wearable device based on the received second signal 507 and filtering scanning operation 812 (e.g., compares stored identification information with identification information stored in the signal to identify whether they correspond to each other). For example, upon receiving the second signal 507 from the second wearable device 302 while performing filtering scanning 812 as shown in 803 of FIG. 8, the electronic device 101 may discover the second wearable device (e.g., device A) as shown in 804 of FIG. 8. The electronic device 101 may identify whether the user wears the second wearable device 302 based on wearing information (e.g., information written in a data area 1012 or 1022) included in the second signal 507 as shown in 805 of FIG. 8. The wearing information included in the second signal 507 is described below in detail with reference to FIGS. 9 and 10.

The electronic device 101 (e.g., at least one processor 120) may release the connection of the first communication 311 and establish the second communication 312 with the second wearable device 302 in operation 706. Operation 706 of the electronic device 101 may be performed like operations 409 and 410 described above, and no detailed description thereof is given below.

Hereinafter, another example embodiment of electronic device 101 and a method for controlling the same are described according to an embodiment. No duplicate description is made below in connection with the operations of the electronic device 101.

According to an embodiment, the first wearable device 301 or the second wearable device 302 may transmit signals for establishing different types of communication before and after worn by the user. The following description is made with reference to the second wearable device 302 for illustration purposes, and the description of the second wearable device 302 may also apply to other electronic devices (e.g., 101 and 301).

Figure 9:
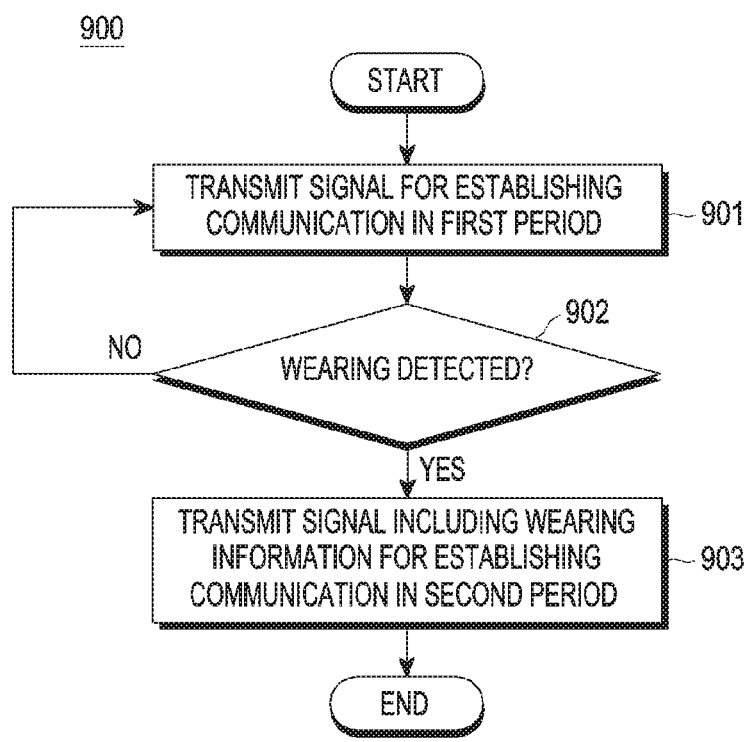
FIG. 9 is a flowchart illustrating transmitting a signal for establishing communication by a wearable device according to an embodiment of the disclosure.

FIG. 9 is a flowchart 900 illustrating transmitting a signal for establishing communication by a wearable device according to an embodiment of the disclosure.

Referring to FIG. 9, operations of the electronic device 101 are not limited in order to the operations of the electronic device 101 shown in FIG. 9 and may be performed in a different order than that shown. According to an embodiment, other additional operations than the operations of the electronic device 101 shown in FIG. 9 may be performed or some of the operations of the electronic device 101 shown in FIG. 9 may be omitted. FIG. 9 is described below with reference to FIG. 10.

Figure 10:
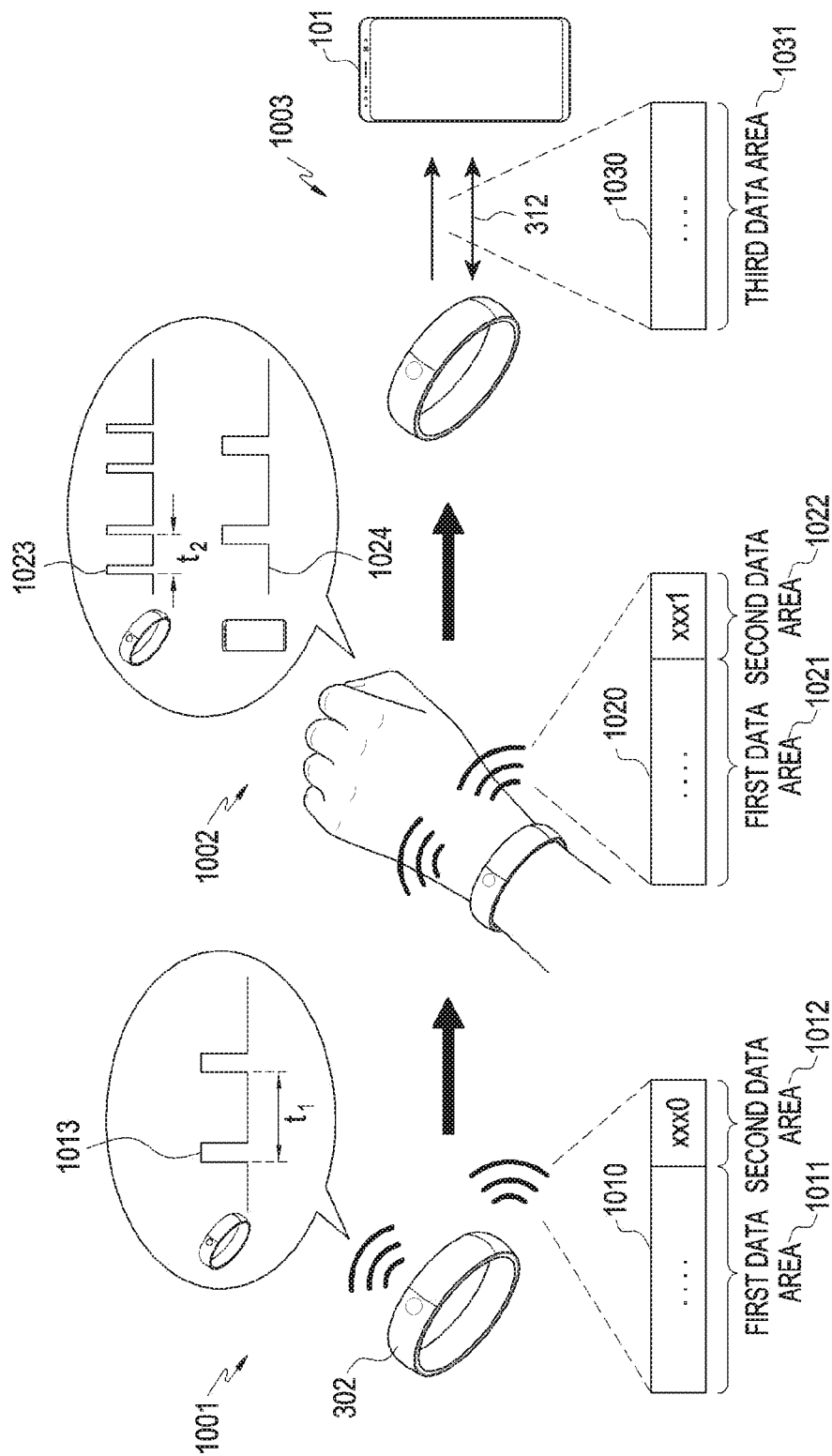
FIG. 10 is a view illustrating transmitting a signal for establishing communication by a wearable device according to an embodiment of the disclosure.

FIG. 10 is a view illustrating transmitting a signal for establishing communication by a wearable device according to an embodiment of the disclosure.

Referring to FIG. 10, the horizontal axis and vertical axis of the signal transmission operation may denote the time and whether the signal is transmitted, respectively.

According to an embodiment, the second wearable device 302 may transmit a signal for establishing communication in a first period in operation 901. The second wearable device 302, if it is before the user is identified to wear, may broadcast (1013) a second-first signal 1010 (e.g., an advertising signal) for establishing communication in a designated first period t1 as shown in 1001 of FIG. 10.

According to an embodiment, the second wearable device 302 may detect whether the user wears it in operation 902. Operation 902 of the second wearable device 302 may be performed like operation 406 of the second wearable device 302 described above, and no detailed description thereof is given below.

According to an embodiment, the second wearable device 302 may transmit a signal including wearing information to establish communication in a second period in operation 903. The second wearable device 302, upon identifying that the user wears the second wearable device 302, may broadcast (1023) a second-second signal 1020 (e.g., an advertising signal) for establishing communication in a designated second period t2 as shown in 1002 of FIG. 10.

According to an embodiment, before and after the user wears the second wearable device 302, different pieces of data (or values or information) may be written in at least one data area 1012 and 1022 of the signal broadcast for establishing communication from the second wearable device 302. For example, data written in the data area 1022 of the signal (e.g., the second-second signal 1020) transmitted from the second wearable device 302 when the user wears the second wearable device 302 may differ from data written in the data area 1012 of the signal (e.g., the second-first signal 1010) transmitted from the second wearable device 302 before user wears the second wearable device 302. For example, the second-first signal 1010 or the second-second signal 1020 for establishing communication transmitted from the second wearable device 302 may include a first data area 1011 or 1021 and a second data area 1012 or 1022. The first data area 1011 or 1021 may have data for establishing communication, e.g., identification information (e.g., device ID or communication address) about the second wearable device 302 written therein, and the second data area 1012 or 1022 may have data indicating whether the user wears the second wearable device 302 written therein. Referring to 1001 and 1002 of FIG. 10, data indicating that the user does not wear the second wearable device 302 or a default value (e.g., 0) may be written in the second data area 1012 of the second-first signal 1010, and data (e.g., 1) indicating that the user wears the second wearable device 302 may be written in the second data area 1022 of the second-second signal 1020. In other words, if the user wears the second wearable device 302, the second wearable device 302 may detect that the user wears the second wearable device 302 and broadcast the second-second signal 1020 including information indicating that the user wears the second wearable device 302.

According to an embodiment, the periods t1 and t2 of broadcasting signals for establishing communication by the second wearable device 302 before and after the user wears the second wearable device 302 may differ from each other. For example, as shown in FIG. 10, the second period t2 may be shorter than the first period t1.

As set forth above, as the broadcasting period of the signal for establishing communication broadcast from the wearable device when the wearable device is worn, the power consumption of the wearable device due to broadcasting may be reduced.

Further, corresponding to an increase in the scanning period (e.g., the period of filtering scanning), as in 1024, as the first communication 311 is established between the electronic device 101 and the first wearable device 301 as shown in FIG. 10, the period of broadcasting the second-second signal 1020 for establishing communication broadcast from the second wearable device 302 is shortened (e.g., as the second period t2). Thus, the time of detecting the second wearable device 302 while the electronic device 101 is in communication connection with the first wearable device 301 may be decreased and, thus, the power consumption due to the scanning by the electronic device 101 and the broadcasting by the second wearable device 302 may be reduced.

As described above, if the second-second signal 1020 of the second wearable device 302 is scanned by the electronic device 101, the second wearable device 302 may establish the second communication 312 with the electronic device 101 as in 1003 of FIG. 10. Information related to the second wearable device 302 may be written in a third data area 1031 of the second signal 1030 transmitted to the electronic device 101 via the second communication 312.

Hereinafter, another example embodiment of electronic device 101 and a method for controlling the same are described according to an embodiment. No duplicate description is made below in connection with the operations of the electronic device 101.

According to an embodiment, the electronic device 101 may perform at least one operation of identifying whether to establish communication with a newly worn wearable device before switching the communication connection to the newly worn wearable device (e.g., the second wearable device 302).

Figure 11:
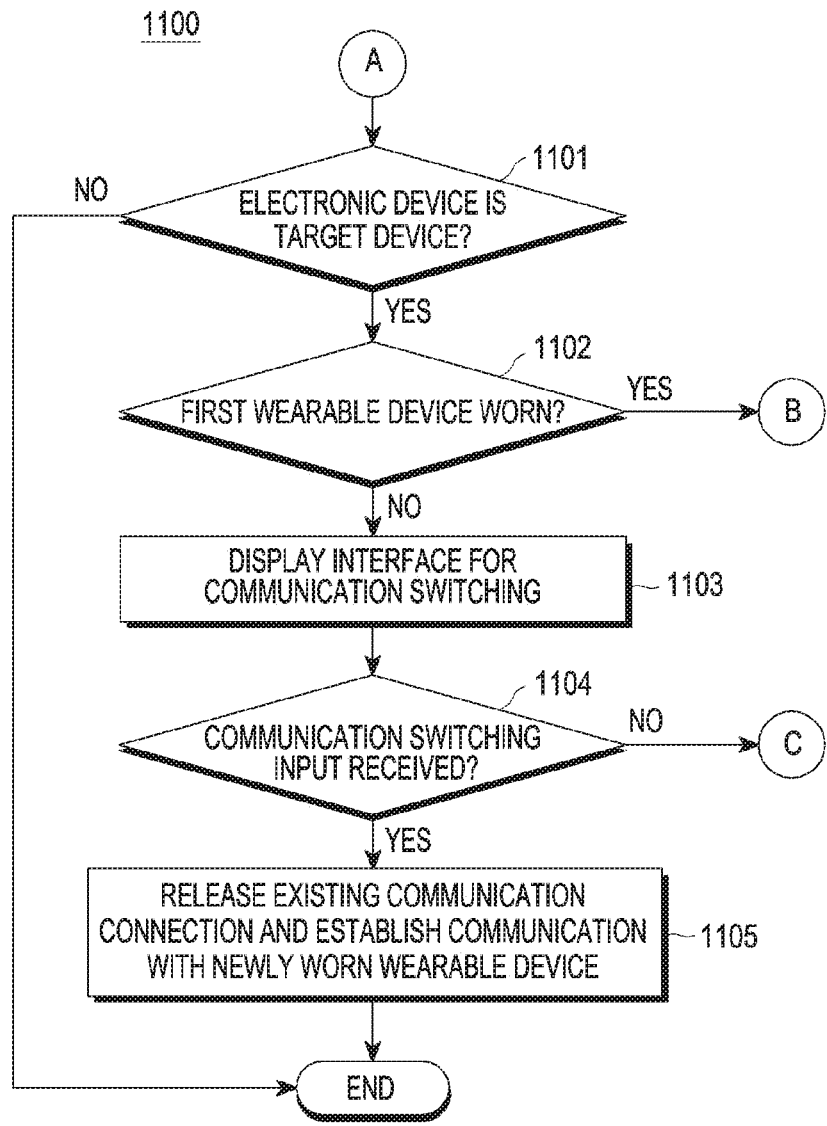
FIG. 11 is a flowchart illustrating an example operation for identifying whether to establish communication with a newly worn wearable device by an electronic device according to an embodiment of the disclosure.

FIG. 11 is a flowchart 1100 illustrating an example operation for identifying whether to establish communication with a newly worn wearable device by an electronic device 101 according to an embodiment of the disclosure.

Referring to FIG. 11, operations of the electronic device 101 are not limited in order to the operations of the electronic device 101 shown in FIG. 11 and may be performed in a different order than that shown. According to an embodiment, other additional operations than the operations of the electronic device 101 shown in FIG. 11 may be performed or some of the operations of the electronic device 101 shown in FIG. 11 may be omitted. FIG. 11 is described below with reference to FIG. 12.

Figure 12:
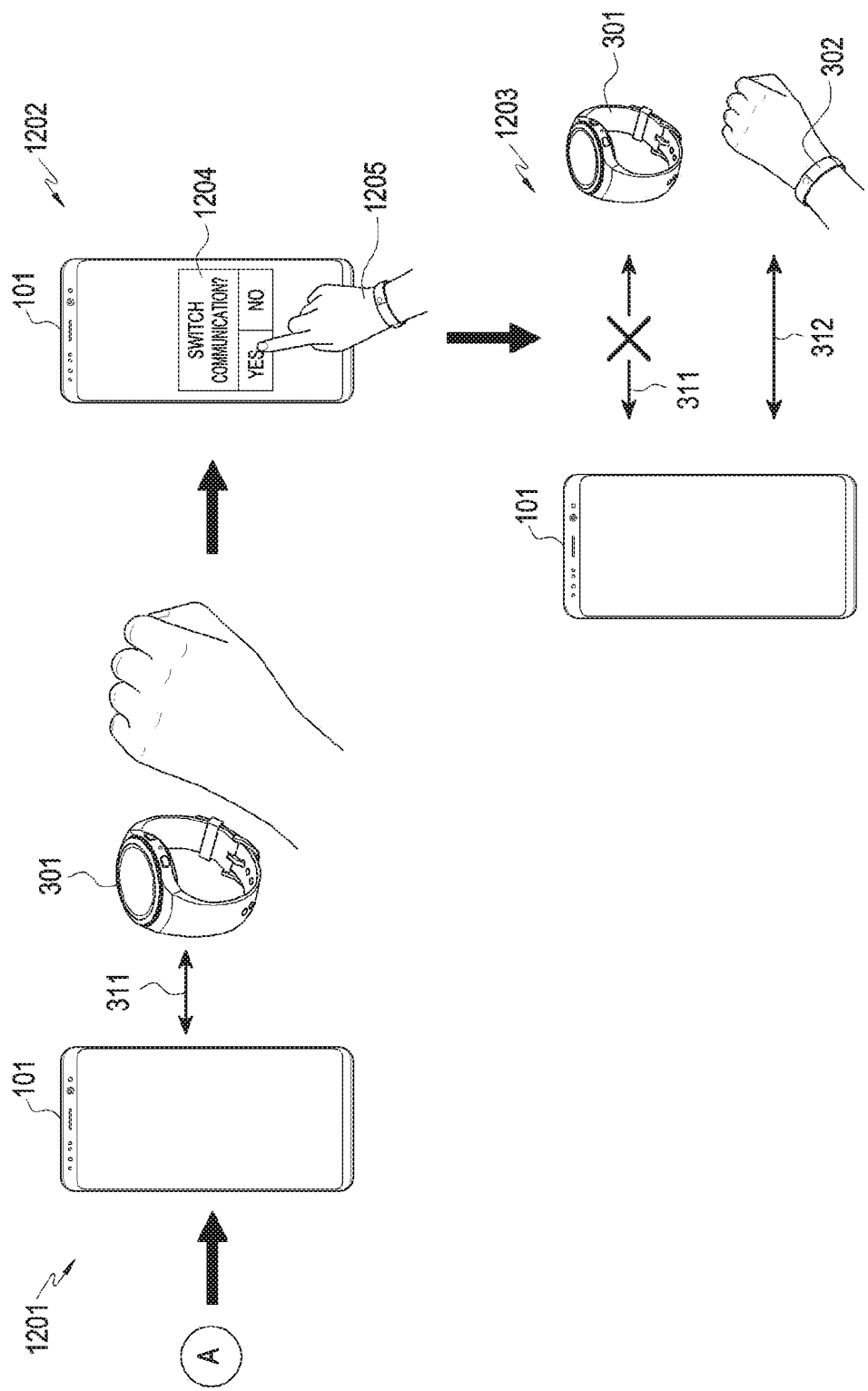
FIG. 12 is a view illustrating an example operation for identifying whether to establish communication with a newly worn wearable device by an electronic device according to an embodiment of the disclosure.

FIG. 12 is a view illustrating an example operation for identifying whether to establish communication with a newly worn wearable device by an electronic device 101 according to an embodiment of the disclosure. According to an embodiment, the electronic device 101 (e.g., at least one processor 120) may identify whether the electronic device 101 is a target device in operation 1101.

Referring to FIG. 12, if the user wears the second wearable device 302, the second signal (e.g., 507 or 1020 described above) broadcast from the second wearable device 302 may include information (e.g., information about the target device) about the target for establishing communication. The information about establishing communication may be written in the second data area of the second signal (e.g., 1020). The electronic device 101 may identify whether the electronic device 101 corresponds to the target information included in the second signal and if the electronic device 101 is identified to be the target device, the electronic device 101 may perform operation 1102 as described below. If the electronic device 101 does not correspond to the target information included in the second signal, the electronic device 101 may exclude the second wearable device 302 from filtering scanning and continue filtering scanning.

According to an embodiment, based on identifying that the electronic device 101 is the target device, the electronic device 101 may identify whether the user wears the first wearable device 301 as in 1201 of FIG. 12, in operation 1102. In other words, the electronic device 101 may identify whether the user wears the second wearable device 302, instead of the first wearable device 301.

According to an embodiment, the electronic device 101 (e.g., at least one processor 120) may identify whether the first wearable device 301 is worn based on information received from the first wearable device 301 via the first communication 311. For example, the first wearable device 301 may identify whether the user wears the first wearable device 301 and transmit information indicating the identified result to the electronic device 101 as in operation 407. The electronic device 101 may identify whether the first wearable device 301 is worn based on the received information indicating whether the user wears the first wearable device 301.

According to an embodiment, the electronic device 101 (e.g., at least one processor 120) may control at least one communication circuit (e.g., the communication module 190 or a communication circuit included in the communication module 190) to receive information for identifying whether the first wearable device 301 is worn from the first wearable device 301 at various times. For example, the information received from the first wearable device 301 may periodically be transmitted from the first wearable device 301 to the electronic device 101. In this case, the information may be received by the electronic device 101 previously before the second wearable device 302 is identified or after the second wearable device 302 is identified. Or, the information received from the first wearable device 301 may be information transmitted from the first wearable device 301 to the electronic device 101 at the request of the electronic device 101. For example, the electronic device 101 may send a request for the information to the first wearable device 301 based on at least one of identification of the second wearable device 302, identification indicating that the user wears the second wearable device 302, or identification indicating that the user does not wear the first wearable device 301.

According to an embodiment, the electronic device 101 (e.g., at least one processor 120) may control the display to display an interface for inquiring whether to switch communication, in operation 1103, based on identifying the user does not wear the first wearable device 301 and, in operation 1104, may identify whether an input for switching communication is received. For example, the electronic device 101 may display an interface 1204 for inquiring whether to switch communication (e.g., release the first communication 311 with the electronic device 101 and establish the second communication 312 with the second wearable device 302), as in 1202 of FIG. 12, based on identifying the user does not wear the first wearable device 301. The electronic device 101 may receive the user's input 1205 for communication switching on the interface 1204 as in 1202 of FIG. 12. However, without being limited thereto, the electronic device 101 may automatically perform communication switching without inquiring to the user about communication switching.

According to an embodiment, upon receiving the input for communication switching, the electronic device 101 (e.g., at least one processor 120), in operation 1105, may control at least one communication circuit (e.g., the communication module 190 or a communication circuit included in the communication module 190) to release the existing communication connection (e.g., connection of the first communication 311 with the first wearable device 301) and establish communication with the newly worn wearable device (e.g., the second communication 312 with the second wearable device 302) as in 1203 of FIG. 12.

Further, if receiving an input indicating that communication switching is not performed, the electronic device 101 (e.g., at least one processor 120) may maintain the existing communication connection (e.g., connection of the first communication 311 with the first wearable device 301) (not shown). Or, when receiving an input indicating that communication switching is not done, the electronic device 101 may maintain the existing communication connection (e.g., connection of the first communication 311 with the first wearable device 301) while establishing communication with the newly worn wearable device (e.g., the second communication 312 with the second wearable device 302). This is described below with reference to FIGS. 15 and 16.

Hereinafter, another example embodiment of electronic device 101 and a method for controlling the same are described according to an embodiment. No duplicate description is made below in connection with the operations of the electronic device 101.

According to an embodiment, when the user wears a wearable device (e.g., the first wearable device 301) already in communication connection with the electronic device 101 puts on another wearable device (e.g., the second wearable device 302), the electronic device 101 may switch the communication connection to the newly worn wearable device.

Figure 13:
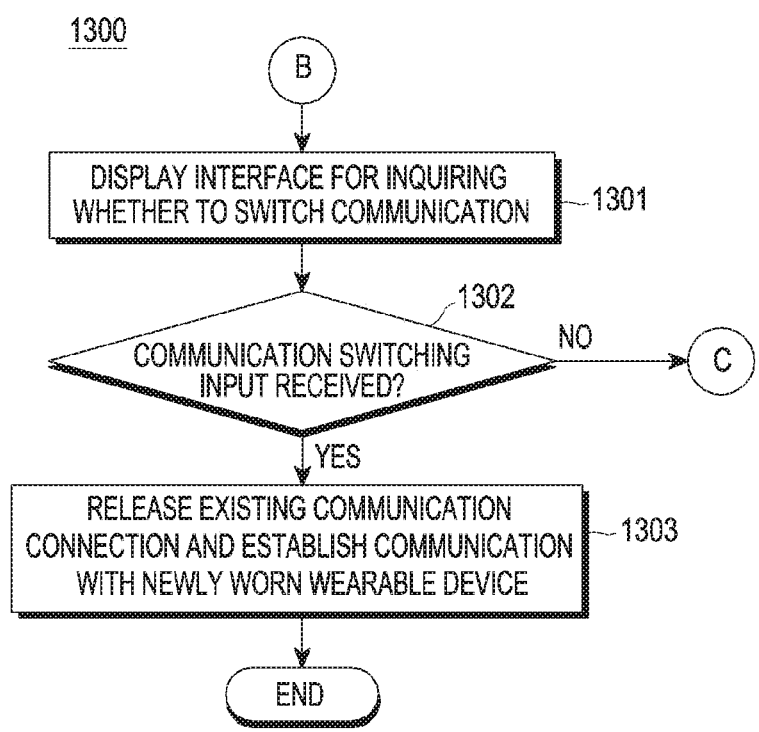
FIG. 13 is a flowchart illustrating an example operation for switching communication connection to another wearable device by an electronic device according to an embodiment of the disclosure.

FIG. 13 is a flowchart 1300 illustrating an example operation for switching communication connection to another wearable device by an electronic device 101 according to an embodiment of the disclosure.

Referring to FIG. 13, operations of the electronic device 101 are not limited in order to the operations of the electronic device 101 shown in FIG. 13 and may be performed in a different order than that shown. According to an embodiment, other additional operations than the operations of the electronic device 101 shown in FIG. 13 may be performed or some of the operations of the electronic device 101 shown in FIG. 13 may be omitted. FIG. 13 is described below with reference to FIG. 14.

Figure 14:
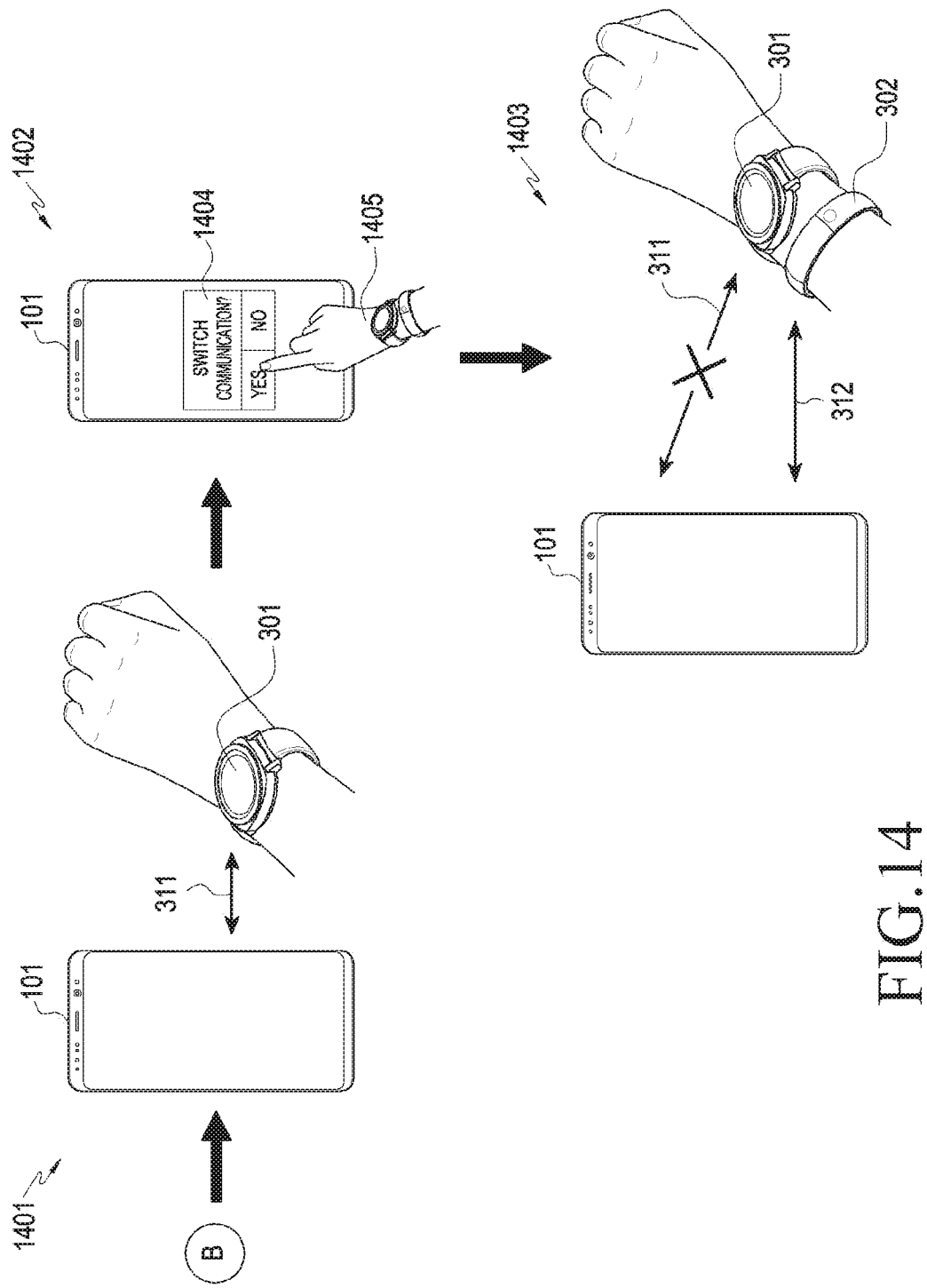
FIG. 14 is a view illustrating an example operation for switching communication connection to another wearable device by an electronic device according to an embodiment of the disclosure.

FIG. 14 is a view illustrating an example operation for switching communication connection to another wearable device by an electronic device according to an embodiment of the disclosure.

Referring to FIG. 14, upon identifying that the user wears a wearable device (e.g., the first wearable device 301) communication-connected before, as in 1401 of FIG. 14, the electronic device 101 (e.g., at least one processor 120) may control the display to display an interface 1404 for inquiring whether to switch communication, as in 1402 of FIG. 14, in operation 1301, and the electronic device 101 (e.g., at least one processor 120) may receive a communication switching input 1405 on the interface 1404 in operation 1302. Operation 1301 may be performed like operation 1103, and operation 1302 may be performed like operation 1104. Thus, no repetitive description is given below. However, without being limited thereto, the electronic device 101 may automatically perform communication switching without inquiring to the user about communication switching.

According to an embodiment, upon receiving the input for communication switching through the interface, the electronic device 101 (e.g., at least one processor 120), in operation 1303, may control at least one communication circuit (e.g., the communication module 190 or a communication circuit included in the communication module 190) to release the existing communication connection (e.g., connection of the first communication 311 with the first wearable device 301) and establish communication with the newly worn wearable device (e.g., the second communication 312 with the second wearable device 302) as in 1403 of FIG. 14.

Further, if receiving an input indicating that communication switching is not performed, the electronic device 101 (e.g., at least one processor 120) may maintain the existing communication connection (e.g., connection of the first communication 311 with the first wearable device 301) (not shown). Or, when receiving an input indicating that communication switching is not done, the electronic device 101 may maintain the existing communication connection (e.g., connection of the first communication 311 with the first wearable device 301) while establishing communication with the newly worn wearable device (e.g., the second communication 312 with the second wearable device 302). This is described below with reference to FIGS. 15 and 16.

When the user of the electronic device 101 changes wearable devices, the electronic device 101 may be communication-connected to the newly worn wearable device (e.g., the second wearable device 302), with the already worn wearable device (e.g., the first wearable device 301) on, the electronic device 101 may receive various services. In other words, the service may be seamlessly provided while changing the wearable devices.

Hereinafter, another example embodiment of electronic device 101 and a method for controlling the same are described according to an embodiment. No duplicate description is made below in connection with the operations of the electronic device 101.

According to an embodiment, the electronic device 101 may simultaneously perform communication connection with a plurality of wearable devices.

Figure 15:
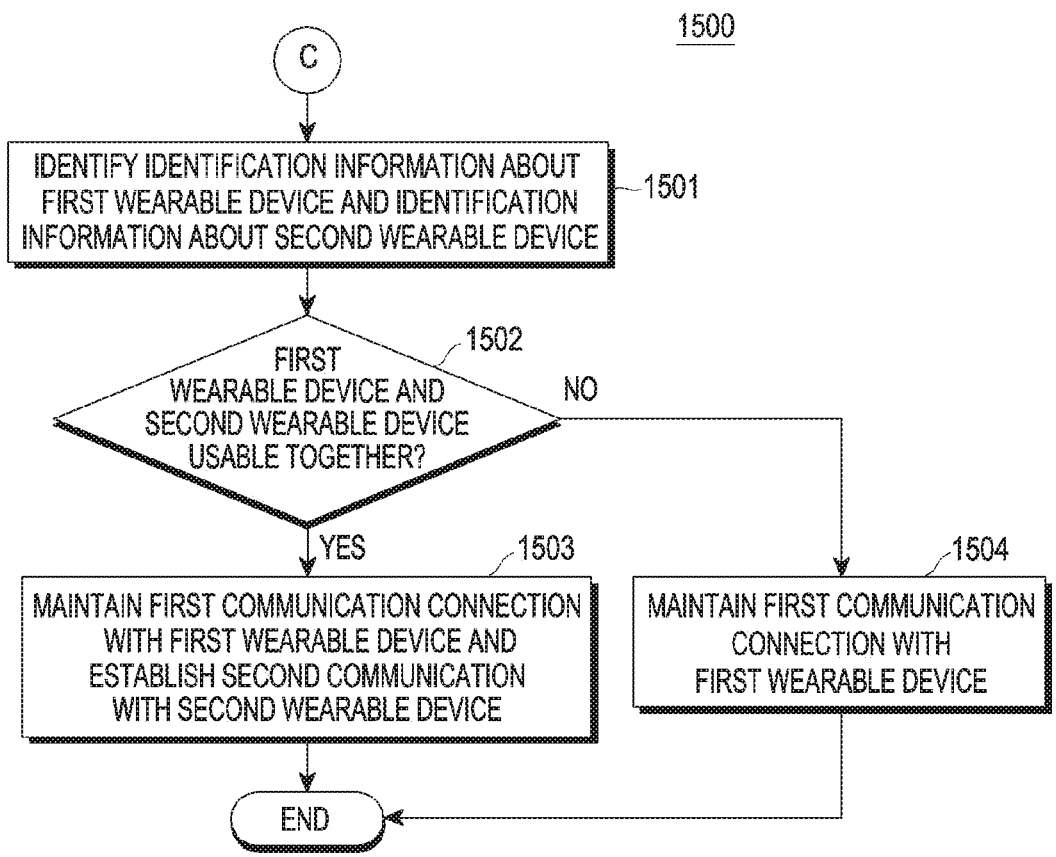
FIG. 15 is a flowchart illustrating an example operation for performing communication connection with a plurality of wearable devices by an electronic device according to an embodiment of the disclosure.

FIG. 15 is a flowchart 1500 illustrating an example operation for performing communication connection with a plurality of wearable devices by an electronic device according to an embodiment of the disclosure.

Referring to FIG. 15, operations of the electronic device 101 are not limited in order to the operations of the electronic device 101 shown in FIG. 15 and may be performed in a different order than that shown. According to an embodiment, other additional operations than the operations of the electronic device 101 shown in FIG. 15 may be performed or some of the operations of the electronic device 101 shown in FIG. 15 may be omitted. FIG. 15 is described below with reference to FIG. 16.

Figure 16:
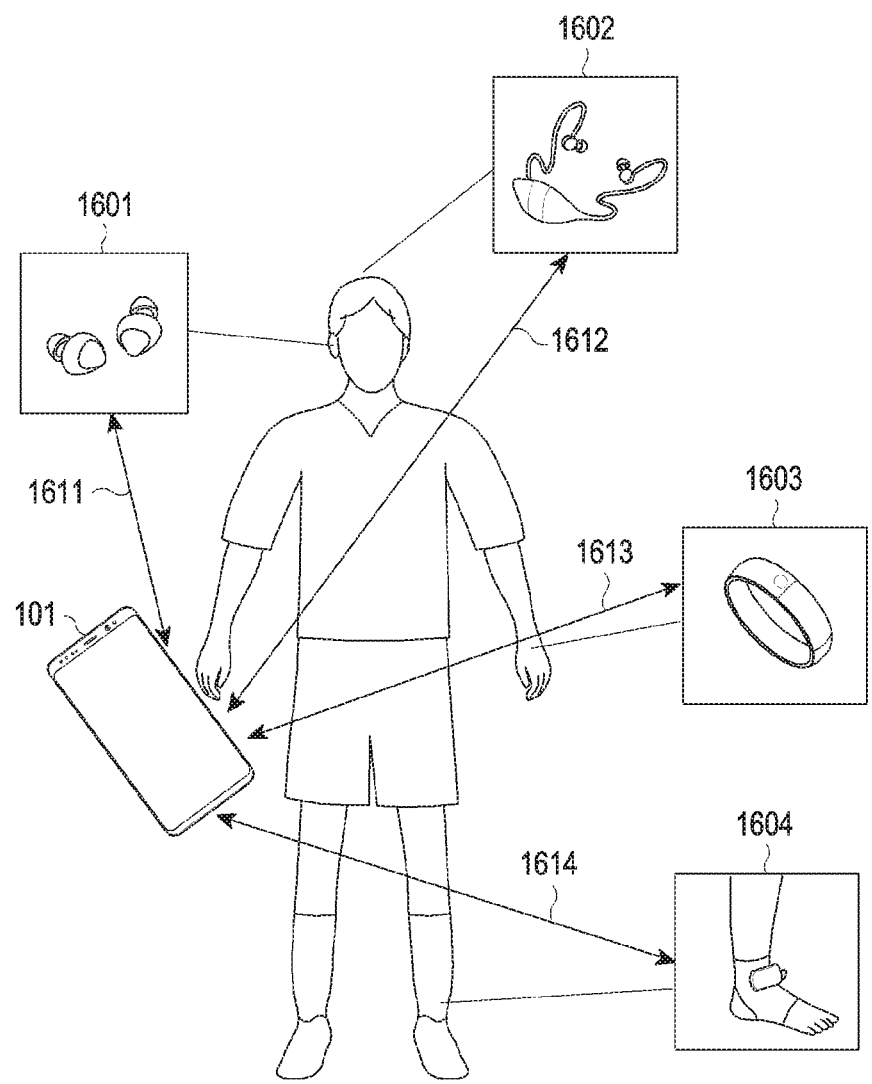
FIG. 16 is a view illustrating an example operation for performing communication connection with a plurality of wearable devices by an electronic device according to an embodiment of the disclosure.

FIG. 16 is a view illustrating an example operation for performing communication connection with a plurality of wearable devices by an electronic device according to an embodiment of the disclosure.

Referring to FIG. 16, the electronic device 101 (e.g., at least one processor 120) may identify identification information (e.g., device ID) about a newly worn wearable device (e.g., the second wearable device 302) in operation 1501. For example, upon receiving an input indicating that communication connection is not switched in at least one of operation 1104 or 1302, the electronic device 101 may identify identification information about the previously worn wearable device (e.g., the first wearable device 301) and identification information about the newly worn wearable device (e.g., the second wearable device 302) so as to identify whether communication connection is required (or possible) between the electronic device 101 and the plurality of wearable devices (e.g., the previously worn wearable device and the newly worn wearable device). The electronic device 101 may identify at least one of a service providable by the first wearable device 301, at least one function of the first wearable device 301, or the kind of the first wearable device 301 based on the identification information about the first wearable device 301 and may identify at least one of a service providable by the second wearable device 302, at least one function of the second wearable device 302, or the kind of the second wearable device 302 based on the identification information about the second wearable device 302.

According to an embodiment, the electronic device 101 (e.g., at least one processor 120) may identify whether the first wearable device 301 and the second wearable device 302 may be used together in operation 1502.

For example, if the previously worn wearable device (e.g., the first wearable device 301) and the newly worn wearable device (e.g., the second wearable device 302) have different features, the electronic device 101 (e.g., at least one processor 120) may identify that the first wearable device 301 and the second wearable device 302 may be used together.

As an example, upon identifying a service providable by each wearable device and that the first wearable device 301 and the second wearable device 302 may provide at least one different service, the electronic device 101 (e.g., at least one processor 120) may identify that the first wearable device 301 and the second wearable device 302 may be used together.

As an example, upon identifying a function of each wearable device and that the first wearable device 301 and the second wearable device 302 have at least one different function, the electronic device 101 (e.g., at least one processor 120) may identify that the first wearable device 301 and the second wearable device 302 may be used together.

As an example, upon identifying the kind of each wearable device and that the first wearable device 301 and the second wearable device 302 are of different kinds, the electronic device 101 may identify that the first wearable device 301 and the second wearable device 302 may be used together.

As another example, even when the previously worn wearable device (e.g., the first wearable device 301) and the newly worn wearable device (e.g., the second wearable device 302) have the same feature, the electronic device 101 (e.g., at least one processor 120) may identify that the first wearable device 301 and the second wearable device 302 may be used together.

As an example, upon identifying that the first wearable device 301 and the second wearable device 302 may provide at least one service that is the same or similar, that the first wearable device 301 and the second wearable device 302 have at least one function that is the same or similar, or that the first wearable device 301 and the second wearable device 302 are of the same or similar kind, the electronic device 101 (e.g., at least one processor 120) may identify that the first wearable device 301 and the second wearable device 302 may be used together.

According to an embodiment, upon identifying that the first wearable device 301 and the second wearable device 302 may be used together, the electronic device 101 (e.g., at least one processor 120), in operation 1503, may control at least one communication circuit (e.g., the communication module 190 or a communication circuit included in the communication module 190) to maintain the connection of the first communication 311 with the first wearable device 301 and establish the second communication 312 with the second wearable device 302 and, upon identifying that the first wearable device 301 and the second wearable device 302 may not be used together, the electronic device 101 (e.g., at least one processor 120), in operation 1504, may control at least one communication circuit (e.g., the communication module 190 or a communication circuit included in the communication module 190) to maintain the connection of the first communication 311 with the first wearable device 301.

For example, upon identifying that the previously worn wearable device (e.g., the first wearable device 301) and the newly worn wearable device (e.g., the second wearable device 302) may be used together, the electronic device 101 (e.g., at least one processor 120) may control the display to display an interface for inquiring whether to maintain the communication with the previously worn wearable device (e.g., the first wearable device 301) and establish communication with the newly worn wearable device (e.g., the second wearable device 302). Upon receiving an input for maintaining communication and establishing communication through the interface, the electronic device 101 may control at least one communication circuit (e.g., the communication module 190 or a communication circuit included in the communication module 190) to maintain the communication with the previously worn wearable device (e.g., the first wearable device 301) and establish communication with the newly worn wearable device (e.g., the second wearable device 302). However, without being limited thereto, the electronic device 101 may automatically perform communication switching without inquiring to the user about communication switching.

Thus, the electronic device 101 may establish a plurality of communication connections 1611, 1612, 1613, and 1614 with a plurality of wearable devices 1601, 1602, 1603, and 1604, respectively, in the context of changing wearable devices as shown in FIG. 16.

Hereinafter, another example embodiment of electronic device 101 and a method for controlling the same are described according to an embodiment. No duplicate description is made below in connection with the operations of the electronic device 101.

According to an embodiment, the electronic device 101 may automatically perform connection with the wearable device.

Figure 17:
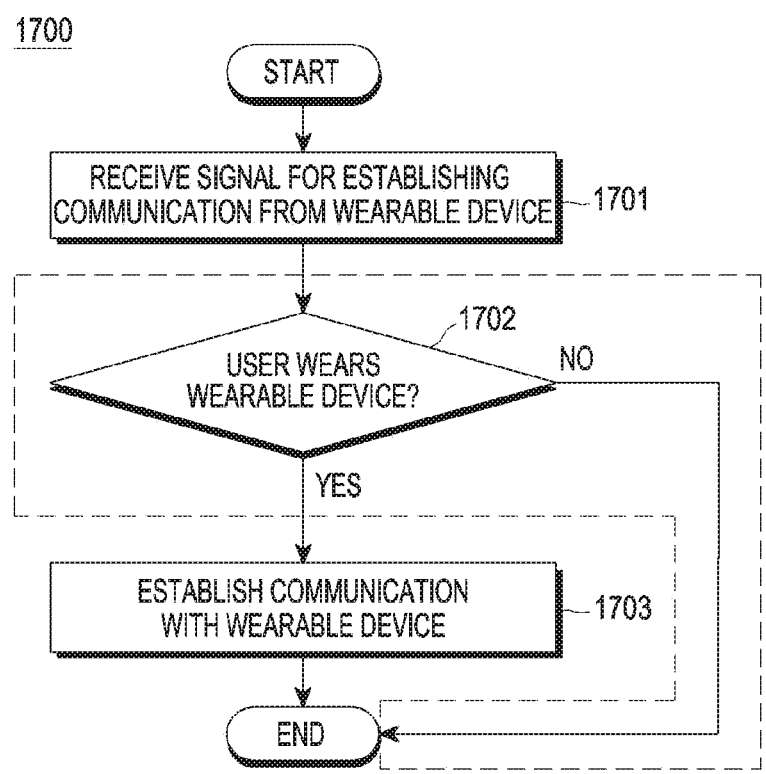
FIG. 17 is a flowchart illustrating an example operation for switching communication connection to another wearable device by an electronic device according to an embodiment of the disclosure.

FIG. 17 is a flowchart 1700 illustrating an example operation for switching communication connection to another wearable device by an electronic device 101 according to an embodiment of the disclosure.

Referring to FIG. 17, operations of the electronic device 101 are not limited in order to the operations of the electronic device 101 shown in FIG. 17 and may be performed in a different order than that shown. According to an embodiment, other additional operations than the operations of the electronic device 101 shown in FIG. 17 may be performed or some of the operations of the electronic device 101 shown in FIG. 17 may be omitted.

According to an embodiment, the electronic device 101 (e.g., at least one processor 120), in operation 1701, may control the at least one communication circuit (e.g., the communication module 190 or a communication circuit included in the communication module 190) to receive a signal for establishing communication from a wearable device. For example, the electronic device 101 may receive a signal for establishing communication from one wearable device when no communication is established with another wearable device (or unless the user wears another wearable device).

According to an embodiment, the electronic device 101 (e.g., at least one processor 120) may identify whether the user wears the wearable device in operation 1702. For example, the electronic device 101 may identify whether the user wears the wearable device based on the wearing information included in the received signal. However, without being limited thereto, the electronic device 101 may, or may not, identify the wearing information about the wearable device. In other words, if the wearable device for which the signal for establishing communication has been currently received is identified to be a wearable device previously communication-connected, the electronic device 101 may perform operation 1703 without identifying whether the wearable device is worn.

According to an embodiment, the electronic device 101 (e.g., at least one processor 120) may control at least one communication circuit (e.g., the communication module 190 or a communication circuit included in the communication module 190) to establish communication with the wearable device in operation 1703. No duplicate description of establishing communication with the wearable device is presented below.

By the above-described operations, the electronic device 101 may automatically establish communication with the wearable device requested for communication connection, eliminating the need for the user to conduct a series of control for establishing communication between the electronic device 101 and the wearable device and hence reducing operation loads due to at least one operation performed by the electronic device 101 and the second wearable device 302 according to such control.

As set forth above, the operation of automatically performing communication connection with the wearable device by the electronic device 101 may be defined as auto connection.

According to an embodiment, an electronic device 101 comprises at least one communication circuit configured to perform communication with at least one external device, at least one processor 120 operatively connected with the at least one communication circuit, and a memory 130 operatively connected with the at least one processor 120, wherein the memory 130 stores instructions to, when executed, enable the at least one processor 120 to establish first communication 311 with a first wearable device 301 using the at least one communication circuit, receive a signal for establishing second communication 312 from a second wearable device 302 using the at least one communication circuit, the signal including information indicating whether a user wears the second wearable device 302, identify whether the user wears the second wearable device 302 based on the wearing information, based on identifying that the user wears the second wearable device 302, release connection of the first communication 311 using the at least one communication circuit and establish the second communication 312 with the second wearable device 302.

According to an embodiment, the memory 130 may be configured to store information related to at least one external device previously connected for communication. The at least one external device may include the first wearable device and the second wearable device. The instructions may be configured to enable the at least one processor 120 to, after establishing the first communication 311, scan a signal received from the at least one external device in a second scan period, based on at least part of the stored information. The second scan period may be longer than a first scan period of scanning a signal received from the first wearable device based on the stored information before establishing the first communication 311.

According to an embodiment, the signal may further include identification information about the second wearable device 302. The instructions may be configured to enable the at least one processor 120 to determine whether the identification information about the second wearable device 302 corresponds to at least part of the stored information and, based on the identification information about the second wearable device 302 corresponding to the at least part of the stored information and identifying that the user wears the second wearable device, release the connection of the first communication 311 using the at least one communication circuit, and establish the second communication with the second wearable device 302.

According to an embodiment, the at least part of the stored information may include information related to the second wearable device 302 with a function for establishing the second communication 312 among at least one wearable device connected for communication before. The instructions may be configured to enable the at least one processor 120 to compare the at least part of the stored information and the identification information about the second wearable device 302 to identify whether the second wearable device 302 has a function for establishing the second communication 312 and, based on identifying that the user wears the second wearable device 302 and that the second wearable device 302 has the function of establishing the second communication 312, control the at least one communication circuit to release the connection of the first communication 311 and establish the second communication 312 with the second wearable device 302.

According to an embodiment, the instructions may be configured to enable the at least one processor 120 to identify whether the user wears the first wearable device 301 based on identifying establishing the second communication 312 with the second wearable device 302 and identifying that the user wears the second wearable device 302, release connection of the first communication 311 and establish the second communication 312 with the second wearable device 302 using the at least one communication circuit, based on identifying that the user wears the first wearable device 301, and maintain the first communication 311 using the at least one communication circuit, based on identifying that the user does not wear the first wearable device 301.

According to an embodiment, the electronic device 101 may further comprise a display. The instructions may be configured to enable the at least one processor 120 to display an interface for inquiring whether to establish the second communication 312 via the display, receive an input for establishing the second communication 312 through the interface, and release connection of the first communication 311 and establish the second communication 312 with the second wearable device 302 using the at least one communication circuit.

According to an embodiment, the instructions may be configured to enable the at least one processor 120 to receive a first signal for establishing the second communication 312 from the second wearable device 302 using the at least one communication circuit, before the user wears the second wearable device 302 and receive a second signal for establishing the second communication 312 from the second wearable device 302 using the at least one communication circuit after the user wears the second wearable device 302. Information written in at least one data area of the second signal may differ from information written in at least one data area of the first signal.

According to an embodiment, the at least one data area of the second signal may include a first data area where first information for establishing the second communication 312 is written and a second data area where the wearing information is written.

According to an embodiment, the instructions may be configured to enable the at least one processor 120 to receive the second signal broadcast from the second wearable device 302 based on the second wearable device 302 being worn by the user, using the at least one communication circuit.

According to an embodiment, the signal further may include information about a target device for establishing the second communication 312. The instructions may be configured to enable the at least one processor 120 to identify the information about the target device included in the second signal and identify establishing the second communication 312 with the second wearable device 302 based on the electronic device 101 corresponding to the target device.

According to an embodiment, the instructions may be configured to enable the at least one processor 120 to release connection of the first communication 311 and establish the second communication 312 with the second wearable device 302 using the at least one communication circuit, with the first wearable device 301 worn by the user.

According to an embodiment, the instructions may be configured to enable the at least one processor 120 to identify whether the first wearable device 301 and the second wearable device 302 are usable together and, based on identifying that the first wearable device 301 and the second wearable device 302 are usable together, maintaining the first communication 311 and establish the second communication 312 with the second wearable device 302 using the at least one communication circuit.

According to an embodiment, the instructions may be configured to enable the at least one processor 120 to identify identification information about the first wearable device 301 and identification information about the second wearable device 302 and identify whether the first wearable device 301 and the second wearable device 302 are usable together based on a result of the identification.

According to an embodiment, a wearable device comprises at least one communication circuit for performing communication with at least one external electronic device, at least one processor 120 operatively connected with the at least one communication circuit, and a memory 130 operatively connected with the at least one process, wherein the memory 130 stores instructions to, when executed, enable the at least one processor 120 to identify whether a user wears the wearable device, broadcast a second signal for establishing the communication using the at least one communication circuit based on identifying that the user wears the wearable device, the second signal including identification information about the wearable device and information indicating whether the user wears the second wearable device, and receive, from the at least one external electronic device, a request message for establishing the communication using the at least one communication circuit, based on broadcasting the second signal.

According to an embodiment, the instructions may be configured to enable the at least one processor 120 to broadcast a first signal for establishing the communication using the at least one communication circuit before identifying that the user wears the wearable device. Information written in at least one data area of the second signal may differ from information written in at least one data area of the first signal.

According to an embodiment, the instructions may be configured to enable the at least one processor 120 to broadcast the first signal in a first period using the at least one communication circuit before identifying that the user wears the wearable device and broadcast the second signal in a second period using the at least one communication circuit based on identifying that the user wears the wearable device. The second period may be shorter than the first period.

According to an embodiment, a method of controlling an electronic device 101 comprises establishing first communication 311 with a first wearable device 301 using at least one communication circuit of the electronic device, receiving a signal for establishing second communication 312 from a second wearable device 302 using the at least one communication circuit, the signal including information indicating whether a user wears the second wearable device, identifying whether the user wears the second wearable device 302 based on the wearing information, based on identifying that the user wears the second wearable device 302, releasing connection of the first communication 311 and establishing the second communication with the second wearable device using the at least one communication circuit.

According to an embodiment, a memory 130 of the electronic device may be configured to store information related to at least one external device previously connected for communication. The method may further comprise, after establishing the first communication 311, scan a signal received from the at least one external device in a second scan period, based on at least part of the stored information. The second scan period may be longer than a first scan period of scanning a signal received from the first wearable device based on the stored information before establishing the first communication 311.

According to an embodiment, the signal may further include identification information about the second wearable device 302. The method may further comprise determining whether the identification information about the second wearable device 302 corresponds to at least part of the stored information and, based on the identification information about the second wearable device 302 corresponding to the at least part of the stored information and identifying that the user wears the second wearable device, releasing the connection of the first communication 311 and establishing the second communication 312 with the second wearable device 302 using the at least one communication circuit.

According to an embodiment, the at least part of the stored information may indicate a second wearable device 302 with a function for establishing the second communication 312 among at least one wearable device connected for communication before. The method may further comprise comparing the at least part of the stored information and identification information about the second wearable device 302 to identify whether the second wearable device 302 has the function for establishing the second communication, and based on identifying that the second wearable device 302 has the function for establishing the second communication 312 and that the user wears the second wearable device 302, releasing the connection of the first communication 311 and establishing the second communication 312 with the second wearable device 302 using the at least one communication circuit.

As is apparent from the foregoing description, various embodiments eliminate the need for the electronic device to perform at least one operation according to the user's series of control for communication connection with the other wearable device, relieving the electronic device of operation loads that would be caused otherwise.

Also, the electronic device does not need to perform at least one operation according to the user's series of control to recognize the external electronic device with which the user desires to establish communication, thus being relieved of operation loads that would be caused otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   at least one communication circuit;
   at least one processor operatively connected with the at least one communication circuit; and
   a memory operatively connected with the at least one processor, wherein the memory stores instructions to, when executed by the at least one processor, enable the at least one processor to:
   control the at least one communication circuit to establish a first communication connection with a first wearable device,
   control the at least one communication circuit to receive a first signal for establishing a second communication connection from a second wearable device, the first signal including first information indicating whether a user wears the second wearable device,
   identify whether the user wears the second wearable device based on the first information,
   based on identifying that the user wears the second wearable device, control the at least one communication circuit to release the first communication connection with the first wearable device and establish the second communication connection with the second wearable device, and based on identifying that the user does not wear the second wearable device, control the at least one communication circuit to maintain the first communication connection with the first wearable device.

2. The electronic device of claim 1,
wherein the memory is configured to store second information related to at least one external device previously connected to the electronic device,
wherein the at least one external device includes the first wearable device and the second wearable device,
wherein the instructions further enable the at least one processor to:
  after establishing the first communication connection, scan for a second signal from the at least one external device in a second scan period based on at least part of the stored second information, and
wherein the second scan period is set to be longer than a first scan period for scanning for a third signal from the first wearable device before the establishing of the first communication connection based on the stored second information.

3. The electronic device of claim 2,
wherein the first signal further includes identification information about the second wearable device,
wherein the instructions further enable the at least one processor to:
  identify whether the identification information about the second wearable device corresponds to at least part of the stored second information, and
  control the at least one communication circuit to release the first communication connection with the first wearable device and establish the second communication connection with the second wearable device further based on identifying that the identification information about the second wearable device corresponds to the at least part of the stored second information.

4. The electronic device of claim 3,
wherein the at least part of the stored second information includes information indicating whether the second wearable device supports a function for establishing the second communication connection among at least one wearable device previously connected to the electronic device, and
wherein the instructions further enable the at least one processor to:
  compare the at least part of the stored second information and the identification information about the second wearable device, and
  based on the comparing, identify whether the second wearable device supports the function for establishing the second communication connection.

5. The electronic device of claim 1, wherein the instructions further enable the at least one processor to:
  identify whether the user wears the first wearable device after establishing the second communication connection with the second wearable device,
  control the at least one communication circuit to release the first communication connection further based on identifying that the user wears the first wearable device, and
  control the at least one communication circuit to maintain the first communication connection further based on identifying that the user does not wear the first wearable device.

6. The electronic device of claim 1, further comprising:
a display,
wherein the instructions further enable the at least one processor to:
  control the display to display a user interface for inquiring whether to establish the second communication connection, and
  receive an input for establishing the second communication connection on the user interface, and
  control the at least one communication circuit to release the first communication connection and establish the second communication connection with the second wearable device further based on the received input.

7. The electronic device of claim 1,
wherein the instructions further enable the at least one processor to:
  control the at least one communication circuit to receive a second signal for establishing the second communication connection from the second wearable device before the user wears the second wearable device, and
  control the at least one communication circuit to receive a third signal for establishing the second communication connection from the second wearable device after the user wears the second wearable device, and
wherein information written in at least one data area of the third signal is different from information written in a corresponding at least one data area of the second signal.

8. The electronic device of claim 7, wherein the at least one data area of the third signal includes a first data area where information for establishing the second communication connection is written and a second data area where information indicating that the user wears the second wearable device is written.

9. The electronic device of claim 8, wherein the instructions further enable the at least one processor to control the at least one communication circuit to receive the third signal from the second wearable device based on the second wearable device being worn by the user.

10. The electronic device of claim 1,
wherein the first signal further includes first information about a target device for establishing the second communication connection, and
wherein the instructions further enable the at least one processor to:
  identify whether the electronic device corresponds to the target device based on the first information about the target device included in the first signal, and
  control the at least one communication circuit to release the first communication connection and establish the second communication connection with the second wearable device further based on identifying that the electronic device corresponds to the target device.

11. The electronic device of claim 1, wherein the instructions further enable the at least one processor to:
  control the at least one communication circuit to release the first communication connection and establish the second communication connection with the second wearable device while the first wearable device is worn by the user.

12. The electronic device of claim 1, wherein the instructions further enable the at least one processor to:
  identify whether the first wearable device and the second wearable device are usable together, and based on identifying that the first wearable device and the second wearable device are usable together, control the at least one communication circuit to maintain the first communication connection and establish the second communication connection with the second wearable device.

13. The electronic device of claim 12, wherein the instructions further enable the at least one processor to:
identify first identification information about the first wearable device and second identification information about the second wearable device, and
identify whether the first wearable device and the second wearable device are usable together based on the first identification information and the second identification information.

14. A wearable device, comprising:
at least one communication circuit;
at least one processor operatively connected with the at least one communication circuit; and
a memory operatively connected with the at least one processor, wherein the memory stores instructions to, when executed by the at least one processor, enable the at least one processor to:
identify whether a user wears the wearable device,
control the at least one communication circuit to broadcast a first signal based on identifying that the user wears the wearable device, the first signal including identification information about the wearable device and information indicating whether the user wears the wearable device,
based on the information indicating that the user wears the wearable device, control the at least one communication circuit to receive, from at least one external electronic device, a request message for establishing a communication connection and establish the communication connection with the at least one external electronic device based on the request message, and
based on the information indicating that the user does not wear the wearable device, control the electronic device to maintain the broadcasting of the first signal.

15. The wearable device of claim 14,
wherein the instructions further enable the at least one processor to:
control the at least one communication circuit to broadcast a second signal for establishing the communication connection before identifying that the user wears the wearable device, and
wherein information written in at least one data area of the first signal is different from information written in a corresponding at least one data area of the second signal.

16. The wearable device of claim 15,
wherein the instructions further enable the at least one processor to:
control the at least one communication circuit to broadcast the second signal in a first period before identifying that the user wears the wearable device, and
control the at least one communication circuit to broadcast the first signal in a second period based on identifying that the user wears the wearable device, and
wherein the second period is shorter than the first period.

17. A method of controlling an electronic device, the method comprising:
establishing a first communication connection with a first wearable device using at least one communication circuit of the electronic device;
receiving a first signal for establishing a second communication connection from a second wearable device using the at least one communication circuit, the first signal including first information indicating whether a user wears the second wearable device;
identifying whether the user wears the second wearable device based on the first information;
based on identifying that the user wears the second wearable device, releasing the first communication connection with the first wearable device and establishing the second communication connection with the second wearable device using the at least one communication circuit; and
based on identifying that the user does not wear the second wearable device, maintaining the first communication connection with the first wearable device.

18. The method of claim 17,
wherein a memory of the electronic device is configured to store second information related to at least one external device previously connected to the electronic device,
wherein the method further comprises:
after establishing the first communication connection, scan for a second signal from the at least one external device in a second scan period, based on at least part of the stored second information, and
wherein the second scan period is longer than a first scan period of scanning for a third signal from the first wearable device based on the stored second information before the establishing of the first communication connection.

19. The method of claim 18,
wherein the first signal further includes identification information about the second wearable device,
wherein the method further comprises:
identifying whether the identification information about the second wearable device corresponds to at least part of the stored second information, and
wherein the releasing of the first communication connection and the establishing of the second communication connection with the second wearable device is further based on identifying that the identification information about the second wearable device corresponds to the at least part of the stored second information.

20. The method of claim 19,
wherein the at least part of the stored second information indicates that the second wearable device supports a function for establishing the second communication connection among at least one wearable device previously connected to the electronic device, and
wherein the method further comprises:
comparing the at least part of the stored second information and identification information about the second wearable device to identify whether the second wearable device has the function for establishing the second communication connection, and
based on identifying that the second wearable device supports the function for establishing the second communication connection and the user wears the second wearable device, releasing the first communication connection and establishing the second communication connection with the second wearable device using the at least one communication circuit.

* * * * *